United States Patent
Kashi et al.

(10) Patent No.: US 12,094,276 B2
(45) Date of Patent: Sep. 17, 2024

(54) SMART LOCKER AGNOSTIC OPERATING PLATFORM

(71) Applicant: SMIOTA, INC., Pleasanton, CA (US)

(72) Inventors: Manjunatha Kashi, Milpitas, CA (US); Kailasnath Dornadula, Fremont, CA (US); Albert Calpito, Pleasanton, CA (US)

(*) Notice: Subject to any disclaimer, the term of this patent is extended or adjusted under 35 U.S.C. 154(b) by 199 days.

(21) Appl. No.: 17/086,391

(22) Filed: Oct. 31, 2020

(65) Prior Publication Data

US 2021/0049846 A1 Feb. 18, 2021

Related U.S. Application Data

(63) Continuation-in-part of application No. 16/572,615, filed on Sep. 17, 2019, and a continuation-in-part of application No. 16/560,691, filed on Sep. 4, 2019, and a continuation-in-part of application No. 16/560,935, filed on Sep. 4, 2019, and a continuation-in-part of application No. 16/209,191, filed on Dec. 4, 2018, now Pat. No. 11,170,339, and a continuation-in-part of application No. 16/185,871, filed on Nov. 9, 2018, now abandoned, and a continuation-in-part of application No. 16/013,930, filed on Jun. 20, 2018, now Pat. No. 10,872,306, and a continuation-in-part of application No. 15/092,585, filed on Apr. 6, 2016, now Pat. No. 10,891,584.

(51) Int. Cl.
*G07C 9/00* (2020.01)
*G06Q 10/0836* (2023.01)
*G07C 9/32* (2020.01)

(52) U.S. Cl.
CPC ..... *G07C 9/00912* (2013.01); *G06Q 10/0836* (2013.01); *G07C 9/00571* (2013.01); *G07C 9/32* (2020.01)

(58) Field of Classification Search
None
See application file for complete search history.

(56) References Cited

U.S. PATENT DOCUMENTS

| | | | | |
|---|---|---|---|---|
| 10,799,051 B2* | 10/2020 | Schmider | | E05G 1/024 |
| 2015/0356801 A1* | 12/2015 | Nitu | | G07C 9/00912 |
| | | | | 340/5.61 |
| 2018/0300679 A1* | 10/2018 | Mahmood | | G06Q 10/0836 |
| 2019/0035186 A1* | 1/2019 | Nitu | | G07C 9/00912 |
| 2019/0313828 A1* | 10/2019 | Schmider | | G07C 9/253 |
| 2020/0019930 A1* | 1/2020 | Kashi | | G06Q 10/0833 |
| 2022/0027848 A1* | 1/2022 | Kashi | | G06Q 10/0836 |

* cited by examiner

*Primary Examiner* — Carlos Garcia

(57) ABSTRACT

Disclosed herein are abstracted smart locker delivery operating systems communicatively coupled to a diverse array of smart locker devices via a flexibly configurable connector architecture.

19 Claims, 9 Drawing Sheets

SMART LOCKER AGNOSTIC OPERATING PLATFORM

CROSS-REFERENCE TO RELATED APPLICATIONS

This application claims priority to U.S. Non-Provisional patent application Ser. No. 15/092,585 filed on Apr. 6, 2016 and titled, "DEVICES, SYSTEMS, AND METHODS FOR STORING ITEMS", which claims priority to U.S. Provisional Patent Application No. 62/146,187 filed on Apr. 10, 2015 and titled, "SMART MAILBOX SYSTEM".

This application also claims priority to U.S. Non-Provisional patent application Ser. No. 16/013,930 filed on Jun. 20, 2018 and titled, "FACILITATING RETRIEVAL OF ITEMS FROM AN ELECTRONIC DEVICE", which claims priority to U.S. Provisional Patent Application No. 62/525,973 filed on Jun. 28, 2018 and titled, "FACILITATING RETRIEVAL OF ITEMS FROM AN ELECTRONIC DEVICE".

This application also claims priority to U.S. Non-Provisional patent application Ser. No. 16/185,871 filed on Nov. 9, 2018 and titled, "FACILITATING RETRIEVAL OF ITEMS FROM AN ELECTRONIC DEVICE", which claims priority to U.S. Provisional Patent Application No. 62/584,071 filed on Nov. 9, 2017 and titled, "FACILITATING RETRIEVAL OF ITEMS FROM AN ELECTRONIC DEVICE".

This application also claims priority to U.S. Non-Provisional patent application Ser. No. 16/209,191 filed on Dec. 4, 2018 and titled, "GENERATING EXCHANGE LOCATIONS", which claims priority to U.S. Provisional Patent Application No. 62/594,168 filed on Dec. 4, 2017 and titled, "GENERATING EXCHANGE LOCATIONS".

This application also claims priority to U.S. Non-Provisional patent application Ser. No. 16/560,691 filed on Sep. 4, 2019 and titled, "THEMED OPERATIONS OF SMART LOCKER DEVICE", which claims priority to U.S. Provisional Patent Application No. 62/727,280 filed on Sep. 5, 2018 and titled, "GENERATING SMART LOCKER MEDIA CONTENT".

This application also claims priority to U.S. Non-Provisional patent application Ser. No. 16/560,935 filed on Sep. 4, 2019 and titled, "MOBILE SMART LOCKER VEHICLES", which claims priority to U.S. Provisional Patent Application No. 62/727,334 filed on Sep. 5, 2018 and titled, "MOBILE SMART LOCKERS".

This application also claims priority to U.S. Non-Provisional patent application Ser. No. 16/572,615 filed on Sep. 17, 2019 and titled, "PACKAGE ANALYSIS DEVICES AND SYSTEMS", which claims priority to U.S. Provisional Patent Application No. 62/732,800 filed on Sep. 18, 2018 and titled, "PACKAGE ANALYSIS DEVICES AND SYSTEMS". The entirety of the aforementioned applications are incorporated by reference herein.

BACKGROUND

Today, the movement of goods from a transportation hub to a final destination for delivery is a process that occurs in most people's lives and often on a daily basis given the rise of e-commerce and package delivery as a major mechanism for obtaining goods. As such, there has been a need to address the issues around the last mile or even last yard of delivery such as when a package is dropped at a reception desk of a employees are delivered packages at work. One form of a solution includes lockers for package delivery and pick up. However, there is a need for updating the traditional locker to provide safe, fast, efficient, and optimized capabilities.

Furthermore, organizations and an aggregation of users whom incur many package transactions each day require secure solutions that can satisfy the high volume based needs of such stakeholders in an efficient and high performance manner. Given, such need, solutions associated with lockers are needed to resolve issues associated with the last mile of delivery.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein are systems, devices, apparatuses, computer program products and/or computer-implemented methods configured as a smart locker platform.

According to an embodiment, a system is provided. The system can comprise one or more processors and one or more storage devices comprising processor executable instructions that, responsive to execution by the one or more processors, cause the system to perform operations. An operation can comprise receiving, by a smart locker platform module, a request to execute at least one of to at least a client services operation, a client partner operation, a client integrations operation, or a client analytics operation. Another operation can comprise initiating, by the smart locker platform a module, fulfilment of the request based on execution of at least one of an application services module, a framework module, or a persistence module.

According to another embodiment, an operation can comprise receiving, by the application services module, a smart locker identifier and a package identifier. Furthermore, another operation can comprise sending, by a smart locker module employed by the application services module, an unlock request to a smart locker device comprising the target smart locker compartment. Also, another operation can comprise receiving, by the smart locker module, a notification of an occurrence of an unlocking event of the target smart locker compartment, a door closing event of the target smart locker compartment, and a locking event of the target smart locker compartment. Another operation can include sending, by the smart locker module, an update to the partner application module of the occurrence of the unlocking event, the door closing event, and the locking event.

BRIEF DESCRIPTION OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
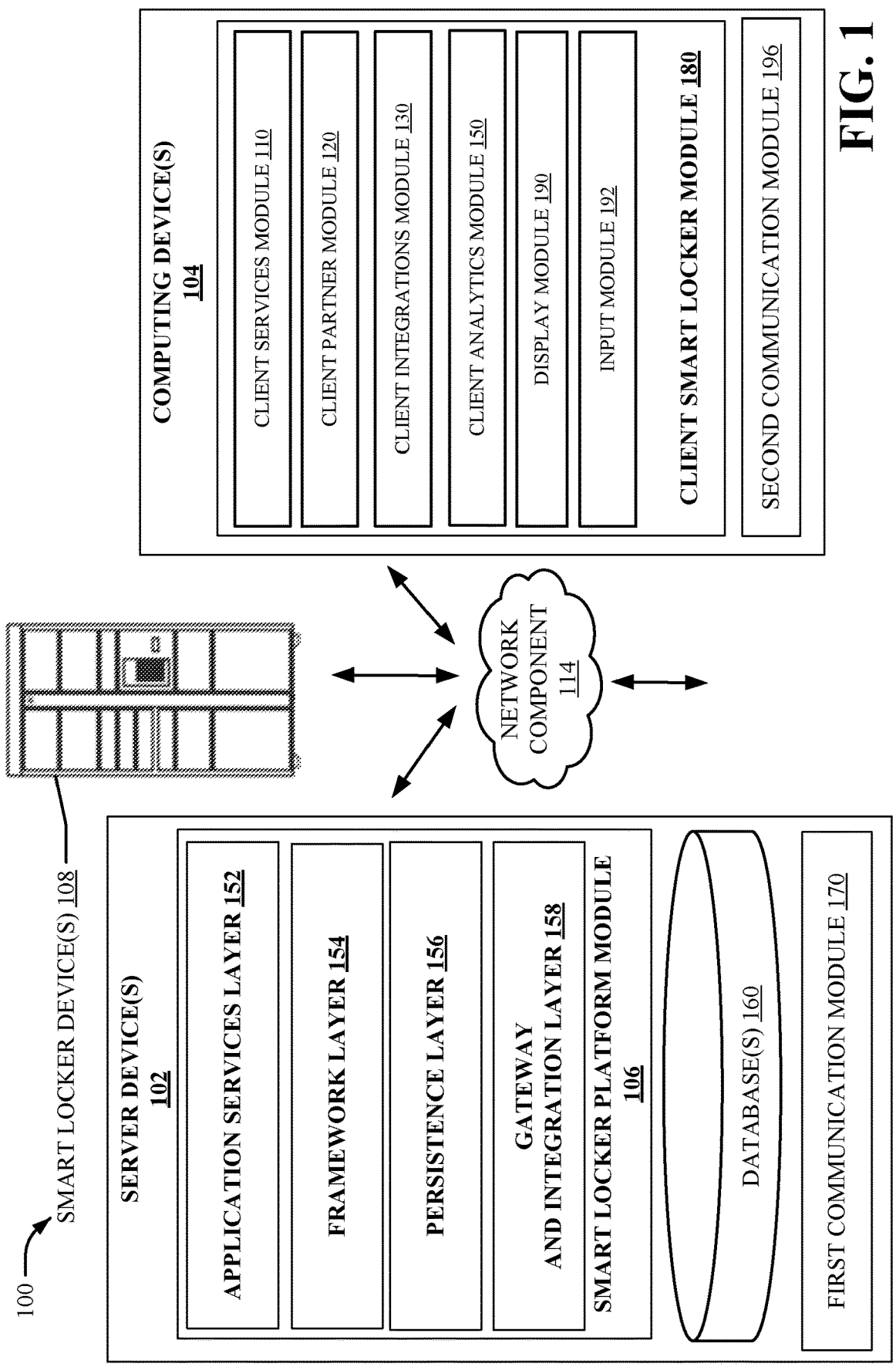
FIG. 1 illustrates an overview of a representative environment in which automated execution of smart locker device operations can be executed in accordance with one or more implementations.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section. Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

By way of a non-limiting introduction, disclosed herein are various non-limiting embodiments of smart locker devices including, but not limited to smart locker devices comprising hardware elements, executable modules, and interconnected computing devices that enables secure storage, delivery and/or retrieval of packages or other articles within the smart locker devices; system embodiments for executing instruction (e.g., by a processor where the instructions are stored in a memory) in connection with smart locker devices to enable execution of automated operations corresponding to the smart locker devices such as storing, delivery, and/or retrieval of parcels; and non-limiting example methods for securely storing, sending and/or retrieving parcels or other items using one or more smart locker device.

Also disclosed are example environments that include servers, computing devices, smart locker devices, cloud communication mechanisms and processing systems configured to perform a range of operations associated with the smart locker devices. The environment can be configured to integrate application modules, integration modules to execute any of a range of mailroom, smart locker, inventory, and package room operations.

The subject disclosure is related to systems, methods, and devices for retrieving, sending, and storing items for delivery. The term item can refer to any 'thing' or 'good' that can be delivered or handled. For example, an item can be mail, food, packages, groceries, medicines, laundry, tobacco, alcohol, gas, or any other such item capable of being delivered using conventional and unconventional delivery infrastructure (e.g., postal services, couriers, family members, friends, business service personnel, drones, enterprise delivery service, etc.). In an aspect, a digital device (also referred to as a smart mailbox, an electronic storage device, device, etc.) is disclosed that employs a memory and a processor to facilitate the storage of items in a secure and convenient manner. The smart mailbox device can comprise a variety of embodiments that allow for the storage of multiple items for a variety of owners and allows for the temporary access by various users (e.g., delivery personnel) and continuous access to the compartments for other users (e.g., owners of the items, intended recipients of the items).

Referring now to FIG. 1, presented is a non-limiting example environment 100 that includes one or more server device(s) 102, one or more smart locker device(s) 108, and one or more computing device(s) 104. In an aspect, smart locker device(s) 108 can be configured as an assortment of one or more locker compartments connected physically (e.g., via hinge mechanism) and communicatively coupled to one or more server device(s) 102. The smart locker device(s) can comprise hardware components such as one or more mainboard (e.g., Bluetooth enabled mainboard), circuit breaker, power module, lock control board (e.g., to control the compartment and door locking mechanisms), lock components (e.g., electronic locks) configured to allow locking of the doors affixed to respective compartment, infrared sensors (e.g., to detect the presence or absence of packages), scanner component, power outlet component, socket components (e.g., USB), ports (e.g., 110V), power outlet (e.g., 110V), radio-frequency integrated circuit (RFIC) readers, bar code scanners (e.g., for package label reading), screws, cables, varied connectivity (e.g., ethernet, Wi-Fi, LTE, etc.) and other such components.

Furthermore, smart locker device(s) 108 can be configured to comprise varied materials (e.g., cold rolled sheets), surface treatments (e.g., powder coatings), color options, a range of structures (e.g., varied number of compartments, doors, compartment sizes, etc.), a range of packaging (e.g., wood casings), and expansion integrations. Furthermore, smart locker device(s) 108 can be configured to execute various operations such as refrigeration, heating, sanitization, de-contamination, and other such operations. For instance, a smart locker device(s) 108 with freezer capability can be configured to store, maintain, and provide access to perishable items such as produce and grocery products. In an aspect, such freezer configured smart locker device(s) 108 can comprise additional components such as additional power supplies, trip switches, cables, compressors, and other such components. Furthermore, the smart locker device(s) 108 can be configured to operate at temperatures between 40 degrees and 70 degrees Fahrenheit and thus be utilized as an indoor device. Furthermore, in an aspect, the smart locker device(s) 108 can be configured to maintain temperatures within compartments of between 33.8 degrees to 42.8 degrees Fahrenheit for refrigeration capabilities and between −1.4 degrees Fahrenheit to −7.6 degrees Fahrenheit for freezer capabilities.

In other aspects, smart locker device(s) 108 can be configured to allow for an automatic open door mechanism and/or manual compartment door opening mechanism. Furthermore, refrigeration configured smart locker device(s) 108 can comprise freezer compartments, refrigerant, insulation layers (e.g., polyurethane), varied insulation thickness (e.g., 100 mm), air colling mechanisms (e.g., forced air mechanisms), controllers (e.g., digital), and/or a compressor component mounted in a range of positions (e.g., top of the unit, etc.). Furthermore, in some instances, smart locker device(s) 108 can comprise varied door types and sizes. For instance, a smart locker device(s) 108 can include a 17 door model (e.g., 13 small compartments, 2 medium, 2 large, etc.), 13 door model (e.g., 5 small, 6 medium, 2 large, etc.), 8 door model, 5 door model, and other such configurations.

In one or more non-limiting embodiment, smart locker device(s) 108 can comprise physical components comprising at least one or more of the following: compartments configured as package receptacles, user interface such as a touch screen or display monitor, compartment doors to provide access to the smart locker compartment, hinges configured to allow an opening and/or closing of the compartment door, locking components (e.g., resistant locks, high security locks, electronic locks, biometric locks, etc.), locker banks of varying shapes and/or sizes and/or dimensions (e.g., assortment of compartment sizes, add on locker bank portions), refrigeration smart lockers (e.g., insulation components, refrigerant components, etc.), heated smart lockers, sensor enabled components of such smart locker device(s) 108 (e.g., temperature sensor, weather sensor, humidity sensor, heat sensor, light sensor, pressure sensors, optical sensor configured for package detection, light beam obstruction and un-obstruction event driven detectors, package measurement sensors via light beams, weight sensors, etc.), drone drop compartments configured to receive packages via drone drop mechanisms, landing pad compartments, global positioning satellite chip enabled functionality, controlled substance compartments comprising heightened access requirements, emergency compartment configurations to carry emergency supplies for access by the general public in case of emergencies, base station for swiveling of a locker, surveillance camera components, microphone components, and other such components.

In another aspect, smart locker device(s) 108 can comprise a system comprising at least one processor, where the system is configured to execute operations such as access control to smart locker device compartments, identity validation of users or consumers of the smart locker device 186, electronic locking and unlocking mechanisms of the compartment lock, provisioning of user permissions to interact with eh smart lockers, execution of online and offline operational functions, controlling and initiating commands for the smart locker device 108, adjusting various settings, deploying presentations and graphics via a user interface display of the smart locker device 108, scheduling access operations, storing packages within the smart locker device 108, executing geo-fencing operations related to the smart locker device(s) 108, employing measuring functions of the smart locker device 108.

Furthermore, in one or more embodiment, smart locker device 108 can comprise firmware that can be configured to provide corresponding functionality between smart locker platform module 106 and client smart locker module 180. For instance, the firmware can be configurable to facilitate the exchange of information, such as images, package labels, audio, video, addresses, commands, queries, messages, and so forth. Furthermore, the firmware can drive hardware of the smart locker device(s) 108 to generate signals and/or process messages used in maintaining a wireless and/or wired communication session. In another aspect, the firmware can be configurable to facilitate data exchanges between smart locker device(s) 108 with other smart locker device(s) 10 and other devices (e.g., tablets, computers, smart phones, etc.). In another aspect, In another aspect, environment 100 comprises one or more server device(s) 102 can employ smart locker platform module 106 configured to execute smart locker device(s) 108 operations, manage smart locker systems, and facilitate all interactions between computing device(s) 104 and smart locker device(s) 108. In an aspect, one or more of the various components and/or modules further described herein can be communicatively coupled to a workload layer of a cloud computing environment to distribute processing activities across a cloud environment. In a non-limiting example embodiment smart locker platform module 106 can employ application services module 152, framework module 154, persistence module 156, and gateway and integration module 158.

In an aspect, smart locker platform module 106 can be configured as a platform that comprises various components, modules, and frameworks implemented to support, create, and manage applications corresponding to smart locker device(s) 108. In an aspect, platform module 106 can enable the delivery of functionality that is tailored to an array of devices such as smart locker device(S) 108 and computing device(s) 104 (e.g., servers, computing terminals, laptops, etc.). In one or more non-limiting implementations, the interconnected architecture of server device(s) 102 allows smart locker platform module 106 to scale and/or manage resources to optimally tailor experiences to all client devices (e.g., computing device(s) 104, smart locker device(s) 108) receiving cloud-based services.

In a non-limiting embodiment, a class of target devices can be created such that experiences can be tailored to the generic class of devices. For instance, a device class may comprise physical features, types of usage, or other common characteristics under a particular definition. Furthermore, in one or more implementation, smart locker platform module 106 can scale and/or manage resources to determine the optimal distributions of such resources among respective devices. For instance, several smart locker device(s) 108 may undertake a high volume of transactions at a given point in time (e.g. after work hours between 5 pm-6 pm) at which point, the smart locker platform module 106 may determine a scale-up of server resources are necessary to satisfy such spike in transactions.

As such smart locker platform module 106 can measure performance indicators of system 100, such indicators including storage usage, memory usage, network bandwidth and other parameters to determine the need for adding or removing resources to support vicissitudes in smart locker device(s) transaction support (e.g., data curation, execution of physical smart locker operations, generation of queries, procurement of insights, and other such indicators. In another aspect, smart locker platform module 106 can comprise various components and frameworks to create and manage applications related to smart locker device(s) 108. Furthermore, the smart locker platform module 106 can allow data to synchronize and share data faster across carious smart locker device applications.

In an aspect, platform module 106 can implement data redundancy across platform layers in order to prevent data loss and allow for greater opportunities to recapture data during data recovery events. Furthermore, smart locker platform module 106 can enable automation of connected device(s) such as smart locker device(s) 108 within the smart locker device environment.

In some embodiments, smart locker platform module 106 can enable operability and connectivity of devices such as hardware connectivity, device cloud connectivity, application connectivity, data management, data storage, data provisioning (e.g., amongst stakeholder systems and devices, sensors, applications), management of smart locker device(s) 108 and applications through wired and/or wireless networks, management of sensors and actuators of the smart locker device(s) 108, management and analysis of aggregated data corresponding to connected smart locker assets and networks to produce actionable insights for specific smart locker device challenges and functions, and other such operability.

In some non-limiting embodiments, smart locker platform module 106 can employ different types of stack architectures that employ multiple interconnected layers. For instance, smart locker platform module 106 can employ application layers, networking layers, workload layers, hardware layers, software layers, management layers, virtualization layers, and other such layers. Furthermore, various implementations can integrate aspects of smart locker platform module 106 into any one or more combination of layers utilizes by cloud-based services. In an instance, one or more of the layers and/or modules disclosed herein can be communicatively coupled to a workload layer of a cloud computing environment to distribute operations such as data generation, insight procurement, smart locker device(s) 108 operability, and other such operations. In an aspect, smart locker platform module 106 can employ application services layer 152, framework layer 154, persistence layer 156 and gateway and integration layer 158.

In a non-limiting embodiment, application services layer 152 can represent an organized of programmable components that interact with other layers (e.g., sequentially, hierarchically, etc.). In an aspect, application services layer 152, can be configured to implement functionality associated with one or more smart locker applications. Furthermore, the application service module can employ an interface configured to permit client device access to a series of applications in a uniform manner. In another aspect, application services layer 152 can enable applications to communicate within a common layer with a common application interface while also maintaining compartmentalization of application components. For instance, application services layer 152 can encapsulate access to a shared database and can plug into a source tree related to the application execution. Furthermore, in an aspect, application services layer 152 aggregate application level operations configured for reuse by several clients (e.g., application-level logic is used in several different controllers), such as smart locker device(s) 108, client device(s) 104, complimentary devices (e.g., package reader devices integrated with the smart locker devices) and other such devices. In yet another aspect, application services layer 152 can be used as an aggregator for queries if it is over a repository pattern and over a query object pattern.

In another non-limiting embodiment, smart locker platform module 106 can employ infrastructure framework layer 154. In an aspect, infrastructure framework layer 154 can be configured as an abstracted set of executable code configured to provide tested general functionality to enable deployment of applications and integrations. The infrastructure framework layer 154 can also provide technical capabilities that support application services layer 152 and other such layers disclosed herein. In yet another aspect, infrastructure framework layer 154 can employ capabilities such as message sending for an application, persistence for one or more domain, drawing widgets for a user interface, and other such capabilities. Also, infrastructure framework layer 154 can be configured to support a pattern of interactions between other layers through an architectural framework.

In yet another non-limiting embodiment, smart locker platform module 106 can employ persistence layer 156 configured to mediate operations between a database engine and application services layer 152. Furthermore, persistence layer 156 enables efficient migration of data to other storage engines that encapsulate database logic within a single layer to enable future modification or replacement of database logic. Furthermore, persistence layer 156 can separate data access components of smart locker platform module 106 from the application execution components in case of a need to change databases. As such, persistence layer 156 allows for a data layer modification in some instances instead of the application services layer 152 or infrastructure framework layer 154.

In another aspect, smart locker platform module 106 can employ gateway and integration layer 158. In an aspect, gateway and integration layer 158 can be configured to register a consumer through a REST API by specifying a unique name and attribute filter for the user. Furthermore, in an aspect, within a fragmentally distributed infrastructural environment (e.g., independent infrastructures, manufacturers components of some smart locker devices), gateway and integration layer 158 can enable a sharing of data and collaboration amongst fragmented devices as well as back-end applications corresponding to a range of devices. Furthermore, gateway and integration layer 158 can be configured to act as an interface standardization tool for device-layer or application integration, orchestration layer for smart locker device(s) 108 resources and other back-end services among different organizations for service-layer integration, and/or execute structured and repeatable operations for smart locker device(s) 108.

In another non-limiting embodiment, server(s) 102 can comprise database(s) 160 configured to store information such as data. In an aspect, database(s) 160 can organize large volumes of data and address large amounts of structured and unstructured data. Furthermore, in an aspect, database(s) 160 can provision formats and structures that allow for consistency in stored data that generates efficiencies in how data is accessed and processed. In another aspect, database(s) 160 can represent any suitable source of data and/or information or storage for data generated by smart locker platform module 106. In another aspect, database(s) 160 can respond to queries, store data according to relational data models or data models or data curation requirements. Also, database(s) 160 can be configured to enable curated storage operations via a prioritization scheme of databases and/or data sources for access by the smart locker platform module 106.

In other embodiments, database(s) 160 can be configured to employ data updating prioritization schemes configured to reduce latency of performance associated with smart locker platform module 106 based de-prioritizing updates of less used and/or obscure data. Furthermore, in some instances, database(s) 160 can be programmatically accessed to return a value, sorted data, numeric sequence requested by smart locker platform module 106. In other instances, database(s) 160 can also store data at rest (e.g., store data after collection or generation) as well as store data in motion (e.g., data collected in real-time). Furthermore, database(s) 160 can employ an interface that can communicate with other device(s) and components such as smart locker platform module 106.

In another aspect, database(s) 160 can be configured as any suitable type of database, data warehouse and/or cloud application such as Structured Query Language (SQL) databases, enterprise data warehouses, data marts, software-as-a service (Saas) based applications, and other such databases. In an aspect, the database(s) 160 can be assigned to workspaces associated with each smart locker device(s) 108, respective computing device(s), and/or applications executing on smart locker platform module 106. Furthermore, database(s) 160 can employ tables and/or data structures to describe relations between data and device(s). As such, database(s) 160 can store relational data models associated with smart locker data curation for particular use (e.g., executing smart locker commands and/or operations).

In an aspect, database(s) 160 can include one or more database interfaces such as SQL interfaces. Furthermore, database(s) 160 can be configured to receive database access commands, consolidate data access events. In another aspect, database(s) 160 can comprise learning databases (e.g., anecdotal data associated with thematic databases such as those databases associated with images, text, package label images, formatting data, addresses, and other such learning databases). In another aspect, database(s) 160 can curate images associated with key words such as "package", "label", "shipping", "address", and other such images.

In another aspect, server(s) 102 can employ first communication module 170 configured as a component of a server that communicates with external devices. Furthermore, first communication module 170 is configured to represent any suitable combination of hardware, software, and/or firmware configurable to facilitate the exchange of information (e.g., images, audio, video, commands, queries, messages, etc.). In another aspect, first communication module 170 can include protocol stacks associated with a network over which data can be exchanged, firmware that can cause the hardware to generate signals and/or process messages used to maintain a wireless communication session.

In an aspect, some implementations include computer networking ports such as Transmission Control Protocol (TCP) port, User Datagram Protocol (UDP) port, File Transfer Protocol (FTP) port, Hypertext Transfer Protocol (HTTP) port, Internet Message Access Protocol (IMAP) port, and Physical communication ports. In yet another aspect, first communication module 170 can be configured to include physical communication ports, serial ports, parallel ports, keyboard ports, universal serial bus (USB) ports, a keyboard port, a display port, an audio port, and other such ports. Furthermore, in an aspect, first communication module 170 can be configured to connect server(s) 102 to other devices over communication cloud 128, such as computing device(s) 104.

In another aspect, system 100 can include computing device 104 which can include client smart locker module 180 that generally represent user access some or all of the functionality provided by client smart locker module 180. In an aspect, computing device(s) 104 can be any suitable type of computing device such as a desktop computing device, a smart phone, a tablet, a laptop, a smart watch and so forth. Furthermore, client smart locker module 180 can provision output information generated from a combination of input data and user information based on smart locker device(s) preferences and other such information.

In some implementations, client smart locker module 180 can represent user access to some or all of the functionality provided by smart locker platform module 106. In another aspect, client smart locker module 180 can represent a stand-alone client application that interfaces into smart locker platform module 106. Furthermore, client smart locker module 180 can represent a browser that remotely logs onto a website hosted by server(s) 102. For instance, client smart locker module 180 and smart locker platform module 106 are illustrated as residing on separate devices, however, some implementations combine some or all the respective module functionality into a single computing device as further described herein. Further, in various implementations, computing device(s) 104 can use client smart locker module 180 to access smart locker device(s) 108 as further described herein. In other implementations, computing device(s) 104 can use client smart locker module 180 to access cloud-based services provided by server(s) 102 via a browser that can remotely log onto a site hosted by server(s) 102. In such example, client smart locker module 180 can include a user interface such as display module 190 to provide user access into features provided by the system, such as inputting a search query, provided user feedback, requesting reports, accessing a dashboard, scheduling smart locker device operations, opening a smart locker compartment, unlocking a smart locker locking mechanism, querying smart locker device data, and other such features.

In a non-limiting embodiment, client smart locker module 180 can employ client services module 110 configured to correspond to a client application that can render a user interface on a corresponding display device (e.g., tablet, computer, etc.), and communicates over a network to a server application such as smart locker platform module 106. In another aspect, client services module 110 can represent a stand-alone application that includes the functionality of service applications executing on smart locker platform module 106 and/or smart locker device(s) 108. For instance, such service applications can include a mailroom service, locker service, service room, inventory service, package room service, recipient services, service level management service, user detection and identification services and other such applications.

In another non-limiting embodiment, client smart locker module 180 can employ client partner module 120 configured to employ a client application that can render a user interface on a corresponding display device (e.g., tablet, computer, smart locker device, etc.), and communicate over a network to a server application such as smart locker platform module 106. Furthermore, client partner module 120 can represent a stand-alone application that can include the functionality of partner applications executing on smart locker platform module 106 and/or smart locker device(s) 108. For instance, such partner applications can include horizontal partners such as network configuration partners, security partners, data visualization partner systems, and/or smart locker device orchestration applications.

In another non-limiting embodiment, client smart locker module 180 can employ client integration module 130. In an aspect, client integration module 130 corresponds to a client application that renders a user interface on a corresponding display device (e.g., tablet, computer, etc.) and communicate over a network to a server application such as smart locker platform module 106. In another aspect, client integration module 130 can represent a stand-alone application that includes the functionality of integrations applications executing on smart locker platform module 106. For instance, such integrations can include a single-sign on application for various identity providers and service providers related to smart locker device(s).

Other integrations can include an API based integrations configured to transmit information and extract information and vice versa to respective API's of smart locker platform module 106. Other integrations can include event-driven integrations configured to receive events such as notification events corresponding to status changes or other events corresponding to the smart locker platform module 106 or smart locker device(s) (e.g., locker door is left open, locker has package in it, locker door is jammed). In other implementations, integrations can include package tracking, package management applications, customer application integrations (e.g., retailers, universities, apartments, wholesalers, etc.), user data import applications or systems. Furthermore, client integration module 130 can provide device access to various features corresponding to integrations provided by the smart locker platform module 106 or smart locker device(s).

In another non-limiting embodiment, client smart locker module 180 can employ client analytics module 150. In an aspect, client analytics module 150 can correspond to a client application that renders a user interface on a corresponding display device (e.g., tablet, computer, etc.), and communicate over a network to a server application such as smart locker platform module 106. Furthermore, client analytics module 150 can represent a stand-alone application that includes the functionality of analytics applications executing on smart locker platform module 106. In another aspect, client analytics module 150 can receive analytics related to the smart locker device(s) over network 114. Furthermore, various triggering events (e.g., package deposited, package retrieved, label tracking info. extracted, transaction occurred) can provision insights and information to the client analytics module 150. In yet another aspect, client analytics module can accesses various features corresponding to analytics generation, management and provisioning provided by the smart locker platform module 106. In another aspect, client device(s) 104 can employ second communication module 196 configured as a combination of hardware, software, and/or firmware that is configurable to facilitate data exchanges with other devices.

Figure 2:
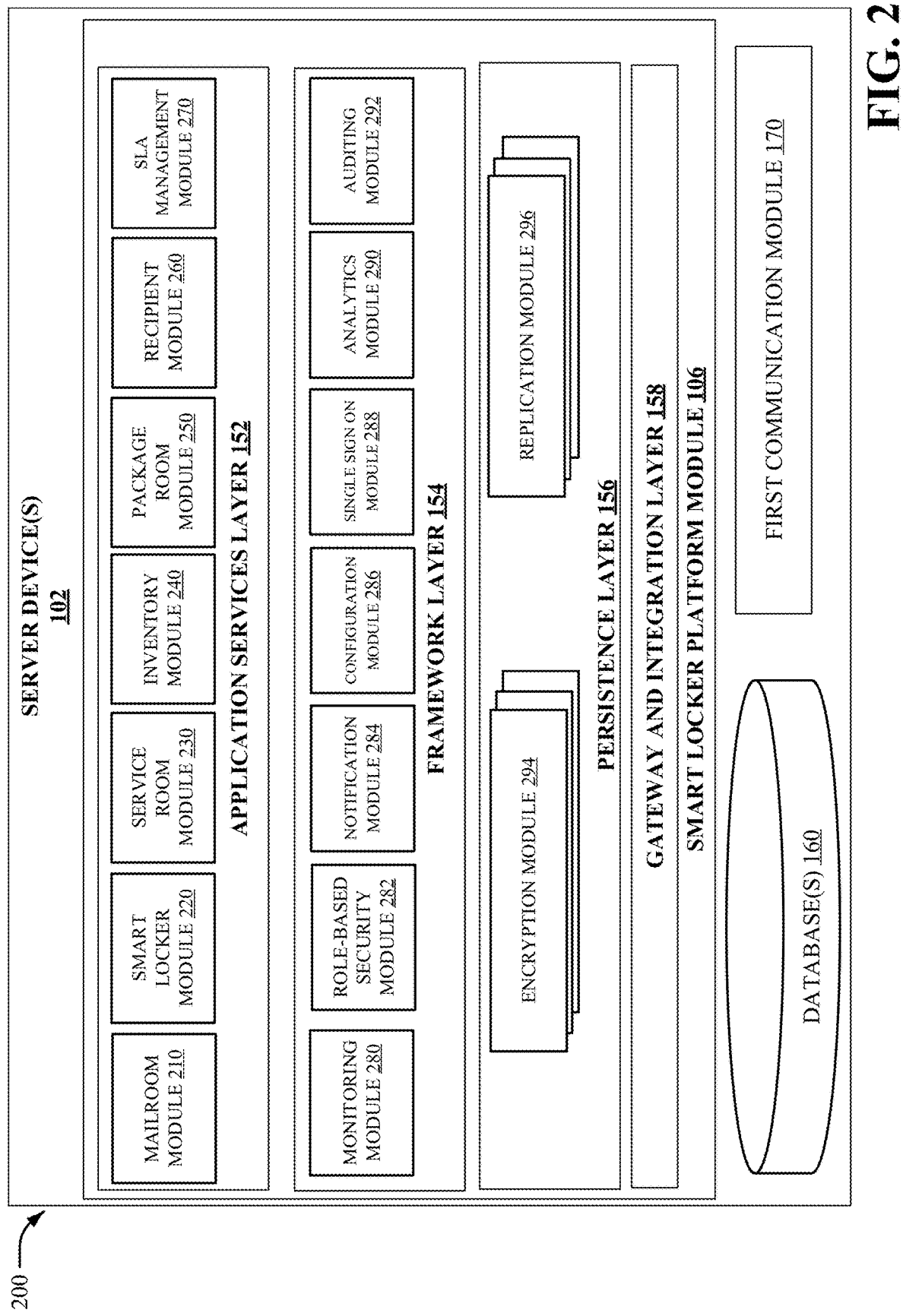
FIG. 2 illustrates an example, non-limiting server(s) device 102 in accordance with one or more implementations.

Turning now to FIG. 2, illustrated is an example, non-limiting server(s) device 102 in accordance with one or more implementations. Repetitive description of like elements employed in other embodiments described herein are omitted for sake of brevity.

In a non-limiting embodiment, environment 200 can comprise server device(s) 102 can comprise an application services layer 152, framework layer 154, persistence layer 156, and gateway and integration layer 158, database(s) 160, and/or first communication module 170. In an aspect, application services layer 152 can employ mailroom module 210, smart locker module 220, service room module 230, inventory module 240, package room module 250, recipient module 260, and Service Level Agreement (SLA) Management Module 270.

Furthermore, framework layer 154 can employ monitoring module 280, role-based security module 282, notification module 284, configuration module 286, single sign-on module 288, analytics module 290, and auditing module 292.

Also, persistence layer 156 can employ encryption module 294 and replication module 296. In an aspect, application services layer 152 can employ mailroom module 210 configured to improve capabilities for large mailrooms. For instance, in one or more implementation, mailroom module 210 can generally represent functionality that can retrieve scan information such as scanned packages within a mailroom. For instance, a computing device(s) 104 such as a mobile smart phone or scanning device can employ mailroom application 320 to scan a set of incoming packages with a mailroom and transmit the scanned information for storage, information curation, and identity data associated with each respective package. In another aspect, mailroom module 210 can acquire and curate package data and other attributes associated with the data to generate metadata to retain and describe the attributes and/or information. Any suitable type of information can be analyzed by mailroom module 210 such as package recipient identity information, delivery location coordinates and address, special instructions corresponding to each package, package type and other such information and package attributes.

In another aspect, mailroom module 210 can apply machine learning algorithms, data mining algorithms, and/or Principal Component Analysis (PCA) algorithms to identify data relationships between the acquired information and/or existing curated data. For example, mailroom module 210 can label sets of data, compare similar data sets, group data sets based on similarities and execute other such operations based on machine-learning algorithms and/or portions of machine learning algorithms. In some implementations, mailroom module 210 can employ similarity comparison algorithms to compare similarity scores between various data subsets. In alternate implementations, additional algorithms can be utilized as well such as to procure insights.

In other implementations, mailroom module 210 can employ iterative data curation processes. Over-time, as more data is curated and analyzed, the iterative process updates corresponding metadata, data models, improved relevancy metric, improving relational data, and other such activities. In other implementations, mailroom module 210 can communicate (e.g., via first communication module 170) with mailroom application 320 executing on a client device(s) 104 (e.g., mobile phone of a package room administrator) via second communication module 196. For instance, client device(s) 104 can employ mailroom application 320 generate registration information corresponding to each package. Furthermore, mailroom module 210 can retrieve the registration information and in connection with notification module 284 transmit notification data corresponding to respective packages to authorized recipients. For instance, mailroom module 210 in connection with notification module 284 can notify client device(s) 104 of authorized user devices (e.g., package recipient device), that a package is deposited into a mailroom or locker, a package is read for delivery (e.g., courier device or mailroom administrator device), a package has been retrieved from the mailroom or locker compartment (e.g., notify a package recipient device). In another aspect, mailroom module 210 in connection with auditing module 292 can register an occurrence of an entire transaction of events on a blockchain or on database(s) 160. Furthermore, all registered events and transactions can be accessed by application services layer 152 to satisfy chain of custody and chain of identity requests.

In an aspect, chain of custody can identify the identity of custodians of a package from the time the package is with a consumer and subsequently to other package custodians such as couriers, mailroom administrators, locker management personnel, package recipients or authorized package retrievers. Furthermore, chain of identity can identify the identity of such package custodians. Furthermore, other events that can be generated by mailroom module 210 and stored in database(s) 160 can comprise package location data at various points in time (e.g., via geo-fencing detection mechanisms). In other implementations, server(s) 102 can employ workload layers to employ functions such as mapping and navigation, software development, lifecycle management, data analytics processing, transaction processing, generate custom package statuses, establish permitted transition events, execute custom instructions, generate and record a complete chain of custody of a package delivery, facilitate large volume of package deliveries across many smart locker device(s) 108 (e.g., lockers installed in large campuses), generate custom package statuses, provision custom instructions to devices and users, generate custom workflows, manage workflows, track package deliveries via devices, generate notifications to remind package recipients about packages and requested delivery management input (e.g., user on vacation notified to manage delivery preferences). Furthermore, mailroom module 210 can provision unique verification criteria to a user device to permit access to target package statuses.

In another aspect, application services layer 152 can employ smart locker module 220 configured to interact with smart locker device(s) 108 and execute management operations, communication operations (e.g., according to smart locker device protocols), data management, data generation, smart locker event identification, curating smart locker data, effectuating smart locker operations and smart locker functionality, smart locker sensor data acquisition, retrieval of smart locker data based on smart locker related queries, execution of package measurement tasks, and other such operations.

For instance, smart locker device(s) 108 can employ a display interface to retrieve input data such as user role data (e.g., courier or recipient identity), user identity data (e.g., QR code corresponding to an identity badge, authorized user pin input data, property name data, etc.), package characterization data (e.g., existing package identity, new package identity), acquire package label information (e.g., vis package scanner data acquired by smart locker device(s) 108 or a scanner module executing on client device(s) 104 such as a mobile phone), acquire unlock data, employ unlock commands to locking mechanisms of smart locker device(s) 108, determining respective locker compartments for package storage based on package criteria (e.g., size requirements, user device preferences, contactless compartment capabilities, etc.), acquiring smart locker event data (e.g., compartment door opened, compartment door closed, locking occurrence, unlocking occurrence, package stored within compartment, package retrieved from a compartment, user device identity verified, integration with package label reading device(s), etc.), acquiring transaction completion events, acquiring custodial data, and other such operations.

In another aspect, smart locker module 220 can be configured to communicate with smart locker application 310 executing on client device(s) 104. In an instance, smart locker module 220 can be configured to identify an arrival of a package recipient at a smart locker device(s) 108. Furthermore, smart locker module 220 can instruct smart locker application 310 to render a locker opening or unlocking capability corresponding to a particular locker compartment number storing a package. As such, smart locker module 220 can receive locker opening instructions from smart locker application 310 and transmit an unlock instruction to the respective compartment with the package related to smart locker device(s) 108. In another aspect, smart locker module 220 can acquire package drop up information (e.g., based on occurrence of a triggering event to smart locker(s) 108 such as locker open and close, weight sensor detection, light beam detection of a package).

In another aspect, smart locker module 220 in connection with notification module 284 can notify a package recipient of arrival of a package within a compartment. For instance, smart locker module 220 can provision smart locker device(s) 108 location, QR code compartment entry data or compartment entry passcode credentials, package details (e.g., number of packages), locker identification data, collection instructions, package tracking numbers, and other such items. Furthermore, in an aspect, smart locker module 220 can acquire identity information of a recipient from smart locker device(s) 108, smart locker device(s) operation data (e.g., compartment opening, compartment closing, locking, unlocking, triggered sensors, sensor detection data, and other such information. In yet another aspect, smart locker module 220 can command smart locker device(s) 108 to execute refrigeration tasks, heating tasks, sanitization tasks, and other such operations.

In another aspect, smart locker module 220 in connection with notification module 284 can stagger the provisioning of notifications to package recipients based on customized safety protocols such as social distancing maintenance requirements between package users dropping off or picking up packages. Furthermore, smart locker module 220 can employ custom rules that configure each locker compartment to only permit a single package in a compartment based on a requirement to restrict parcels from interacting with other contaminated items and/or surfaces. Furthermore, smart locker module 220 can enable locker compartment opening via empowering client device(s) 104 to issue operational commands to smart locker device(s) 108 via smart locker application 310 and smart locker module 220. As such, contamination of a user is lessened by a user interfacing with its own user device rather than a user interface embedded within smart locker device(s) 108 itself.

In yet another aspect, smart locker module 220 can also communicate with database(s) 160 to store information corresponding to smart locker device(s) 108 such as smart locker transactions, smart locker events, smart locker operations, scheduling data and other such information. In an aspect, database(s) 160 can be accessed by smart locker module 220 to access large amount of smart locker device(s) 108 data. Furthermore, database(s) 160 can be programmatically accessed to return an average value, a weighted sum, a maximum value in a numeric sequence, sorted data, and so forth in relation to smart locker device(s) 108.

Turning now to another non-limiting embodiment, application services layer 152 can employ service room module 230 configured to generate, organize, enable maintenance, and manage facilities within a location. In an instance, service room module 230 can be configured to receive task assignment data, room type data corresponding to a facility, room identifier information, customized maintenance schedule information, service level agreement report information (e.g., based on frequency, data range, building, room type, etc.), and other such data from service application 340 (e.g., illustrated in FIG. 3) of client device(s) 104. For instance, service application 340 can employ scanning modules configured to scan room information (e.g., a QR code, bar code, etc.), validate completion of one or more task corresponding to the scanned room (e.g., hand sanitizer present task, align task, marker refill task, chair alignment task, etc.), and confirm completion of various room events and/or a complete transaction. In another aspect, service room module 230 can be configured to determine insights related to rooms based on deployment of machine learning models implemented on data corresponding to service room module 230. In an aspect, a workload layer can be employed by server device(s) 102 to interconnect with other layers and distribute any processing operations associated with service module 230.

In another non-limiting implementation, application services layer 152 can employ inventory module 240 to enable mapping, evaluation, management and monitoring of inventory (e.g., corresponding to supplier client devices) and delivery operations. Furthermore, inventory module 240 in connection with smart locker module 220 and smart locker device(s) 108 can be configured to collect, evaluate, extract insights and propagate information, and employ determinations based on insight extraction as whether to shortages of materials stored within smart locker device(s) 108 (e.g., smart lockers within warehouses, distribution centers, manufacturing centers, etc.) exist, shifts in smart locker demand events occurred, changes in environmental conditions corresponding to smart locker inventory based on threshold value determinations, and/or failure events corresponding to inventory (e.g., packages, items) deliveries.

In various implementations, machine learning information, machine learning model updates, and machine learning model parameters can be extracted from each smart locker device. In another non-limiting implementation, application service layer 152 can employ package room module 250 configured to acquire, process, curate, analyze, and extract insights of input data generated by package room application 360. In an aspect, package room module 250 can communicate with and access database(s) 160 to compare one or more identifier of a package (e.g., package label information, QR code, etc.) to user device identifier information stored within one or more database(s) 160 (e.g., authorized resident database). Furthermore, package room module 250 can evaluate package size dimensions and determine an appropriate locker compartment to unlock and open in order for the respective package to be deployed in such compartment (e.g., by a courier or delivery person).

As such, package room application 360 employed on a client device(s) 104 (e.g., courier device) can acquire package identifier information, client device identifier information, package size information, and other such information from package room application 360. Furthermore, package room module 250 can command smart locker device(s) 108 to automatically open and unlock locker compartment doors for appropriate sized package storage within the locker. Accordingly, package room application 360 can be configured to allow for quick package delivery by a courier based on communication between package room module 250, package room application 360 and smart locker device(s) 108.

In another aspect, application services layer 152 can be configured to employ recipient module 260 that in connection with notification module 284 can notify a client device(s) 105 (e.g., belonging to a user) that a package is safely stored in a locker compartment. In an aspect, the notification can be triggered based on triggering events (e.g., locker opening and closing) identified by other modules within application services layer 152. In another aspect, recipient module 260 can acquire information from recipient detection application 330 such as locker door opening command information. Based on the information, recipient module 260 can perform a query response operation, a machine learning task, a predictive analysis task, or instruct smart locker device(s) 108 an operational command function (e.g., unlock and open a respective locker compartment based on the client device command request).

In another aspect, such cascade of events can be automatically triggered based on an occurrence of triggering events. In an aspect, a client device can input a unique code (e.g., QR code, PIN code, facial recognition data, biometric entry data, etc.) at recipient detection application 330. Also, recipient module 260 can be configured to access package history information, package transactional events, other client device information (e.g., courier device identity, delivery date of a package), package type information, location information (e.g., where a package was retrieved or deposited), and other such information for a client device 104 (e.g., belonging to a user) to access. In yet another aspect, application services layer 152 can employ SLA Management Module 270 can be configured to acquire event data and transaction data to compare against service level criteria and requirements. For instance, SLA management module 270 can track a package delivery time (e.g., via a smart label on the package, tracking sensor, tracking number, etc.) and compare such package movement and delivery timing against target package movement and delivery times. Furthermore, SLA management module 270 in connection with notification module 284 can notify client device(s) regarding package movement.

In one or more non-limiting implementations, server device(s) 102 can employ framework layer 154 comprising monitoring module 280, role-based security module 282, notification module 284, configuration module 286, single sign on module 288, analytics module 290, and auditing module 292. In an aspect, monitoring module 280 can be configured to enable security mechanisms that lock functionality and access to smart locker device(s) 108 in various respects such as mobile device management. In an aspect, monitoring module 280 can be configured to monitor the security of logging events such as client device(s) 104 logging into applications that provide access to server device(s) 102 functionality and smart locker device(s) 108.

In another aspect, monitoring module 280 can employ monitoring of logging metrics, time parameters regarding package delivery, monitor audit logs, security command centers, stack drivers, technology environments, application logs and other such items for purposes of generating security-based triggers. For instance, if a monitoring of a logging event or an audit event appears suspicious (based on a normalization of events and assignment of normalized values to current values that are greater than a threshold normalized value) then monitoring module 280 can integrate with other modules employed by server device(s) 102 to trigger a disabling of a function (e.g., a client device selectable option, allowance of a user-based behavior implemented by a client device, generation of a security protocol, disable an application, etc.).

Also, monitoring module 280 can be configured to monitor interactional data between a client device(s) 104 and smart locker device(s) 108 to generate contextual data and extract insights related to respective client device interactions. For instance, monitoring module 280 can monitor client device interactions such as typical time ranges during which a client device requests an action be taken by server device(s) 102 and/or smart locker device(s) 108. Examples of such user interactions can include application launch events, package delivery scheduling events, package drop-off and/or pick-up locations, content request events (e.g., requesting package tracking information), and other such interactions.

In another aspect, framework layer 154 can employ role-based security module 282 configured to enable securing the environment 100 and environment 200 and the device(s) and applications within such environments. For instance, role-based security module 282 can enable role-based configurable security such as configuring server device(s) 102 to authorize identity providers to assign users, client devices and devices requesting access to devices and applications within environment 100 to be assigned roles. In another instance, server device(s) 102 and smart locker device(s) 108 can be assigned roles as service providers that delegate authentication provisioning by identity providers. The roles from the identity providers can be mapped to service provider roles and registered users can exist in the service providers database in order to be authorized.

In an aspect, role-based security module 282 (e.g., assigns roles to user devices and providers) in connection with single sign on module 288 can be configured to authorize a user device to access server device(s) 102 and smart locker device(s) 108 via a single sign-on mechanism. For instance, an authorized identity provider can provision multi-factor authentication techniques by generating a token that the service provider (server device(s) 102) verifies (e.g., trusts) and redirects such token to a client device(s) 104. Thereafter a user of the client device(s) 104 can be connected (e.g., logged into) to server device(s) 102 and implemented layers. Furthermore, other service providers configured within environment 100 and 200 can be accessed by client device(s) 104 via such mechanism.

In another non-limiting implementation, framework layer 154 can employ configuration module 286 to configure hardware components and/or software modules, such as various hardware and/or software modules associated with server(s) 102 and/or client device(s) 104. In an aspect, configuration module 286 can configure one or more executable instructions to modify user interface elements, by one or more executable processors of server(s) 102, client device(s) 104, and/or smart locker device(s) 108 including instructions to modify the navigation layer, data capture mechanisms, screen transition logic, notification customizations, SMTP server customizations, rules for triggering notification customizations, alert triggering notifications, workflow customizations (e.g., courier-recipient standardizations, check-in-check-out workflows, product order and locker access workflows, etc.), access retrieval mechanisms (e.g., scan-based, passcode-based, etc.), reporting customizations, object definitions, role-based configurable security mechanisms, single sign-on integration (e.g., in connection with single sign on module 288) configurations, smart locker authentication mechanisms (e.g., badge-based, single-sign-on based, mobile passcode based authentication, etc.), and other such customizations.

In another non-limiting implementations, framework layer 154 can employ analytics module 290 can communicate with other modules and devices to exchange information, define data structures (e.g., describes an amount of data stored with a data structure, describe a format in which data is stored with the data structure, establish rules that outline what type of information the data in the data structure can describe, etc.), establish a set of rules to provide a mechanism for cross-entity sharing, establish rules to determine a prioritization of data sources used to acquire curated data, rules that determine data manipulation and smart locker device manipulation based on a desired operation, condition-based rules, validation-based, rules, mapping rules that can translate a data structure.

In another implementation, analytics module 290 can select and run various algorithms on data, such as machine-learning algorithms, to identify a result (e.g., results sometimes based on queries), analyzes the insight engine module to identify various types of insights. For instance, analytics module 290 can apply algorithms to extracted smart locker device data, contextual data, anecdotal data, behavioral data, and other such data sources to determine insights about smart locker usage, scheduling, package drop off, package pick up, smart locker interactions, and predictions regarding how these may operate into the future.

In an aspect, an insight and/or prediction generated by analytics module 290 can be compared to a general insight and/or prediction. Furthermore, an actual value vs a predicted value can be compared by analytics module 290 and an accuracy evaluation can be used to adjust a machine learning model, parameters of such model and hyper-parameters of such model that are used to act on data and generate insights and predictions related to smart locker devices. In another aspect, analytics module 290 can perform operations of running algorithms, analyzing data, identifying insights and tuning hyper parameters as an iterative process that can achieve results to implement as processor-executable instructions that drive the behavior of the processor, hardware, firmware or any combination thereof of a smart locker device(s) 108.

In an aspect, analytics module 290 can also access database(s) 160 (e.g., application database, audit database, IOT database, diagnostic database, CSV database, SFTP database, etc.) to render smart locker device(s) 108 diagnostic information, historical data auditing and provision event driven notifications. Furthermore, analytics module 290 can execute evaluations based on regions with smart locker device(s) 108, smart locker unit device components, open service requests on smart lockers, smart locker usage, package receipt trends, smart locker audit information, package time ranges, pickup time measurements over time spans, and other such information for evaluation. In another implementation, framework layer 156 can employ auditing module 292 which is configured to execute auditing tasks such as a state of respective smart locker device(s) 108, alerts for errors of smart locker device(s) 108, hardware malfunction events, security issues associated with each smart locker device(s) 108 (e.g., door left open after package submission or retrieval from a compartment), logging and monitoring events security testing operations, hardware functionality, and other such audits.

In another non-limiting implementation server device(s) 102 employs persistence layer 156 configured to employ encryption module 294 and replication module 296. In an aspect, any data generated and/or acquired by server device(s) 102 can be encrypted, via encryption module 294, and can also employ encryption keys configured to be encrypted by a master key. As such, persistence layer 156 provisions security mechanisms to protect data from security breaches. In an aspect, the encryption can be advanced encryption standards and can be encrypted by symmetric keys to encrypt data when it is used and data when it is stored. The master key can be used to decrypt such data and can be stored in a secure key store and changed frequently. In another implementation, persistence layer 156 can employ replication module 296 configured to manage distributed databases and connect primary storage locations of data with secondary storage locations of data (e.g., off site locations). In an aspect, replication module 296 can execute data replication tasks via asynchronous replication or via synchronous replication. As a consequence, environment 100 and 200 can achieve load reduction because replicated data can be spread over several server device(s) 102, improved performance of server(s) 102 due to less burdensome load from queries, and high availability of server(s) 102 and thus performance of devices and systems disclosed herein.

Figure 3:
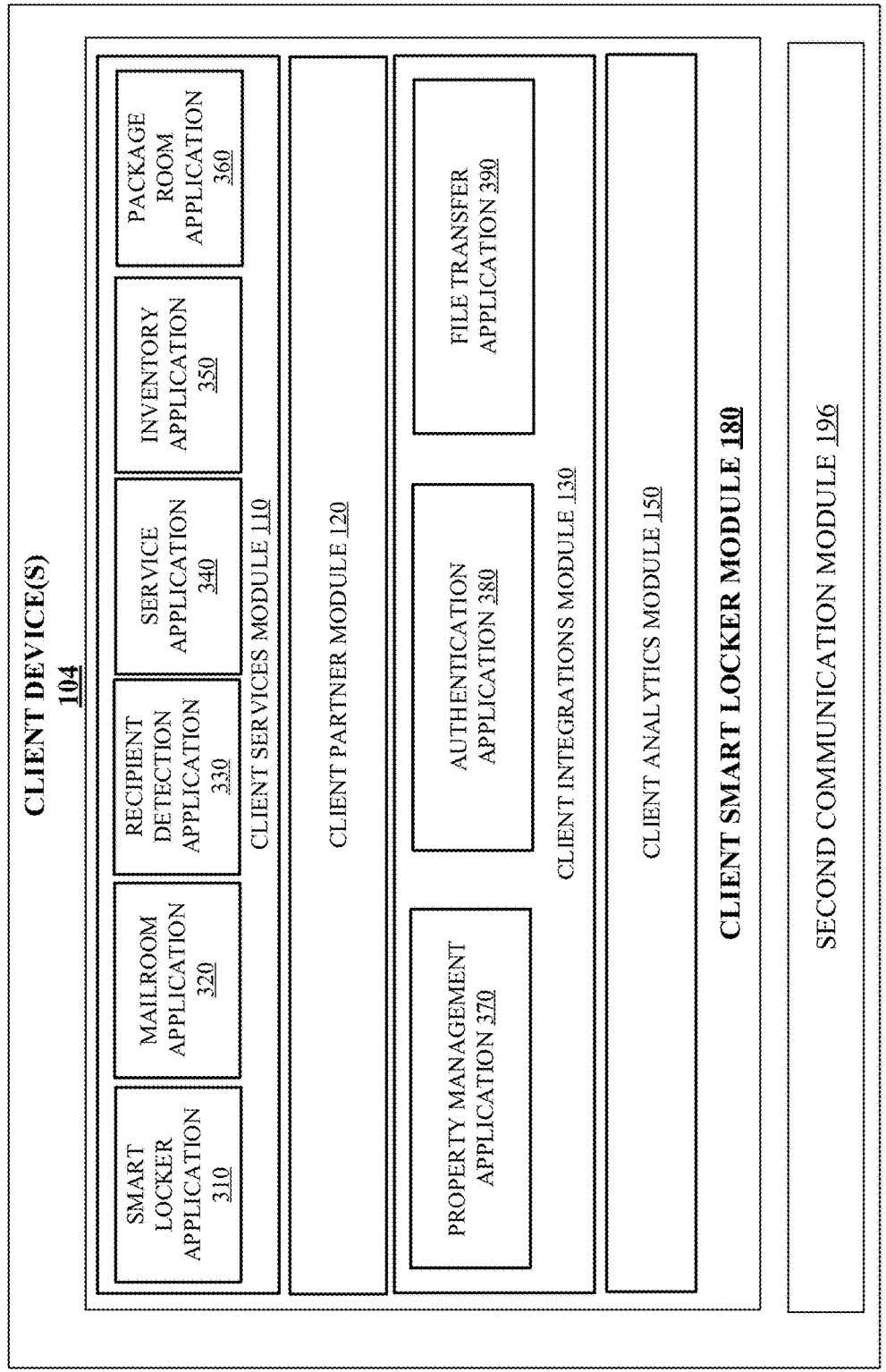
FIG. 3 illustrates an example, non-limiting client device(s) 104 in accordance with one or more implementations.

Turning now to FIG. 3, illustrated is an example, non-limiting client device(s) 104 in accordance with one or more implementations. Repetitive description of like elements employed in other embodiments described herein are omitted for sake of brevity.

In an aspect, client device(s) 104 can be any of a range of computing device such as a module phone, tablet, smart watch, laptop, personal digital assistant, desktop computer and other such devices. The client device(s) 104 is configured to employ several modules including second communication module 196 to communicate over a network (e.g., network 114) to access the layers, modules, and databases of server device(s) 102 and the functionality of the hardware, software, and firmware elements of smart locker device(s) 104. In one or more implementations, client device(s) 102 can employ client services module 110, client partner module 120, client integrations module 130, and client analytics module 150.

In an aspect, client services module 110 is configured to employ smart locker application 310, mailroom application 320, recipient detection application 330, service application 340, inventory application 350, and package room application 360. In other non-limiting implementations, client integrations module 130 is configured to execute property management application 370, authentication application 380, and file transfer application 390. In an aspect, client smart locker module 180 is configured to access smart locker platform module 106 and/or features provided by smart locker platform module 106. Furthermore, client services services module 110 can employ smart locker application 310 configured to communicate with smart locker module 220. Furthermore, mailroom application 320, recipient detection application 330, service application 340, inventory application 350, and package room application 360 can communicate with, via second communication module 196, and access mailroom module 210, recipient module 260, service room module 230, inventory module 240, and package room module 250 respectively.

In yet another aspect, client partner module 120 is configured to access smart locker platform module 106 and corresponding application processing interfaces. Furthermore, client partner module 120 can integrate client frameworks to execute mapping and transformation operations with smart locker platform module 106. As such, smart locker platform module 106 can be configured to call external systems through client partner module 120. In yet another aspect, client integrations module 130 can employ property management application 370, authentication application 380, and file transfer application 390 to access smart locker platform module 106 via gateway and integration layer 158 and first communication module 170.

In yet another aspect, client analytics module 150 can access and communicate with analytics module 290. Furthermore, client analytics module 150 is configured to render analytics results on a display of client device(s) 105. In an aspect, property management application 370 is configured to integrate with property management systems. In another aspect, authentication application 380 is configured to integrate with authentication systems in some implementations. In another aspect, file transfer application 390 is configured to access recipient data and input data to database(s) 160 via various file transfer formats (e.g., CSV, SFTP or pull, logs through external systems, etc.).

Figure 4:
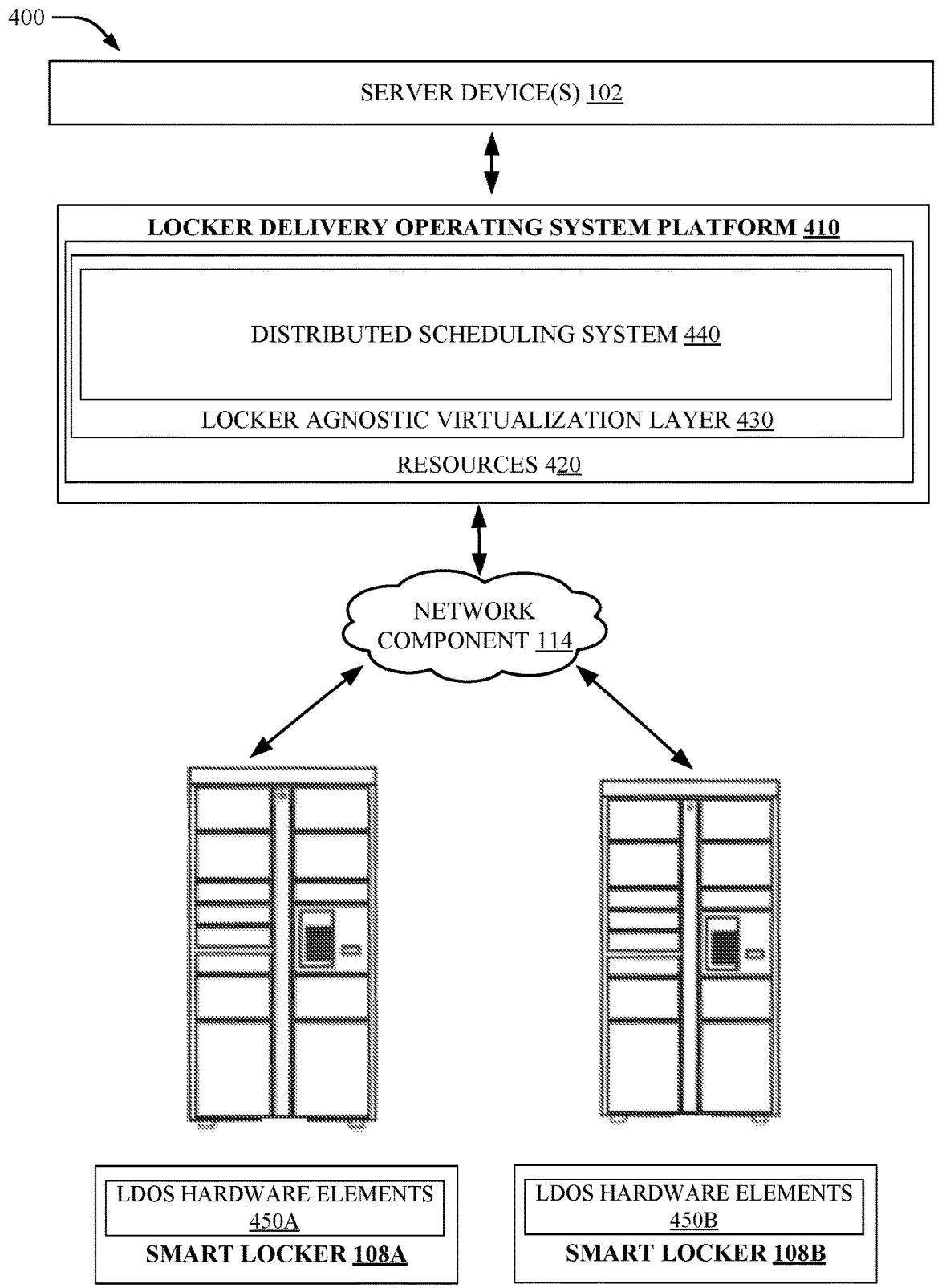
FIG. 4 illustrates an example, non-limiting locker delivery operating system in accordance with one or more implementations.

Turning now to FIG. 4, illustrated is an example, non-limiting locker delivery operating system in accordance with one or more implementations. Repetitive description of like elements employed in other embodiments described herein are omitted for sake of brevity.

In an aspect, environment 400 illustrates server device(s) 102, network component 114, smart locker 108A, smart locker 108B, LDOS hardware elements 450, LDOS hardware elements 450B, locker delivery operating system platform 410 configured to employ resources 420, locker agnostic virtualization layer 430, and distributed scheduling system 440. In an aspect, Locker Delivery Operating System Platform 410 (also referred to as LDOS platform 410) is configured as a hardware agnostic smart locker operating system technology that can support any smart locker device hardware through a connection architecture.

In an instance, LDOS platform 410 can employ resources 420 which may include hardware (e.g., servers) and software resources of a cloud infrastructure. Furthermore, resources 420 can include applications and/or data that can be utilized while computer processing is executed on servers that are remote from client device(s) 104. For example, resources can include smart locker platform module 106. In another aspect, resources 420 can function to connect smart lockers (e.g., smart locker 108A and smart locker 108B) to computing device(s) 104 and smart locker platform module 106. In an aspect, resources 420 can abstract the scaling of resources to provide a corresponding level of scale to encountered demand for resources 420.

In another aspect, the LDOS platform 410 can abstract the underlying functionality of hardware (e.g., smart locker(s) 108 hardware) from the locker application. As such, locker agnostic virtualization layer 430 can employ a library of high level canonical callable application programming interfaces (APIs) that can be used by other software, hardware, and/or firmware to trigger operational control of different smart locker hardware architecture. For instance, locker agnostic virtualization layer 430 can map a series of API's to a specific smart locker device hardware based on a hardware specific connection architecture that supports a broad array of smart locker hardware variations.

Accordingly, application services layer 152 can be configured to embed any range of hardware variations as part of the client smart locker module 180 (employed via client device 104 such as a tablet) via the mapping API's employed by locker agnostic virtualization layer 430. In another aspect, locker agnostic virtualization layer 430 and/or client smart locker module 180 can be configured to communicate with application services layer 152. Accordingly, LDOS platform 410 allows all the functionality enabled by smart locker platform 106 to support a variety of different types of smart locker device(s) (e.g., smart locker 108A and smart locker 108B). This allows for an agnostic platform to operate any smart locker device is configured to employ the LDOS hardware specific connectors (e.g., LDOS hardware elements 450A and LDOS hardware elements 450B).

In an aspect, LDOS hardware specific connectors can include various wired connectors for different smart locker types including, but not limited to, various wired connectors (e.g., ethernet, recommended standard 232 (RS-232), recommended standard 485 (RS-485), Bluetooth, Controller Area Network Bus Connectors (CAN), etc.). In an aspect, an LDOS module can be employed by application services layer 152 and also by client smart locker module 180. Accordingly, client smart locker module 180 can communicate with and control the smart locker device controller through LDOS API's executing on client smart locker module 180, via the hardware specific connectors, and within application services layer 152 (through a communication between client smart locker module 180 and application services layer 152).

Furthermore, the LDOS hardware specific connectors (e.g., LDOS hardware elements 450A and LDOS hardware elements 450B) can connect the motherboard of the smart locker device (e.g., smart locker 108A and smart locker 108B) via the LDOS hardware elements 450B (e.g., console unit) and the client smart locker module 180 (e.g., via API's). As such, smart locker device(s) 108A and 108B can include any mix of hardware to be abstractly controlled by the application services layer 152. For instance, an ambient smart locker device, refrigerated smart locker device, heated smart locker device, bin based smart locker device, large cage smart locker device and any other smart locker device type can be configured for control by application services layer 152 including obtaining the security strength, enhanced functionality and improved maintenance capabilities of different smart locker types.

In a non-limiting implementation, client device(s) 104 can be configured as a tablet locked into deploying only applications specific to a smart locker device(s). As such, the client device(s) 104 can be communicatively coupled to the smart locker device(s) 108 and continuously monitor and remotely manage the smart locker device(s) 108 functionality. Furthermore, in an aspect, the client device(s) 104 can be secured within a secure console. In another aspect, communication from client device(s) 104 to the motherboard of the smart locker device(s) 108 can occur via a wired or wireless connection. The communication framework between the client device(s) 104 connected to the motherboard of smart locker device(s) 108 can allow for the client device(s) 104 to control locking mechanisms and sensor mechanisms of the smart locker device(s) 108. In implementations that lack wireless connections between client device(s) 104 and motherboard, the security risk against threats to the system are reduced as well.

In other implementations, the implementation of LDOS platform 410 across any smart locker type and variety enables smart locker device(s) 108 of all types to daisy chain together and allow for a scaled deployment of a large volume of smart locker devices within a single platform. As such, a large set of smart locker device(s) 108 can be configured to connect with one another and a smart locker system that enables them to function in a cooperative scheme under a single framework. Furthermore, in an aspect, LDOS platform 410 allows smart locker device(s) 108 to connect via redundant frameworks to ensure automatic fallback connectivity exists and smart locker device(s) 108 will remain connected in the event a breakdown of one connection modality occurs. For instance, connectivity can occur via WiFi, ethernet, LTE, and/or via offline mode.

In another aspect, locker agnostic virtualization layer 430 can employ distributed scheduling system 440 configured to share learned information about the smart locker device(s) 108 and propagate insights generated from the learned information to the smart locker device(s) 108 to allow for optimal execution of various functions. For instance, distributed scheduling system 440 can forward learnings from a set of smart locker device(s) 108 to client device(s) 104, which in turn forwards such learnings to server(s) 102. Server(s) 102 can extract insights from the learnings and implement modifications to smart locker device(s) 108 operations and behaviors such as scheduling behaviors (e.g., scheduling of drop off and pickup activities) to enable optimal usage of the smart locker device(s) in alignment with various user behaviors (e.g., consumers, package recipients, couriers, smart locker administrators, etc.). In another aspect, distributed scheduling system 440 is abstracted from the smart locker device(s) and can keep smart locker device(s) information private while only extracting and sharing learnings, not private data of the underlying owner of the smart locker devices.

Figure 5:
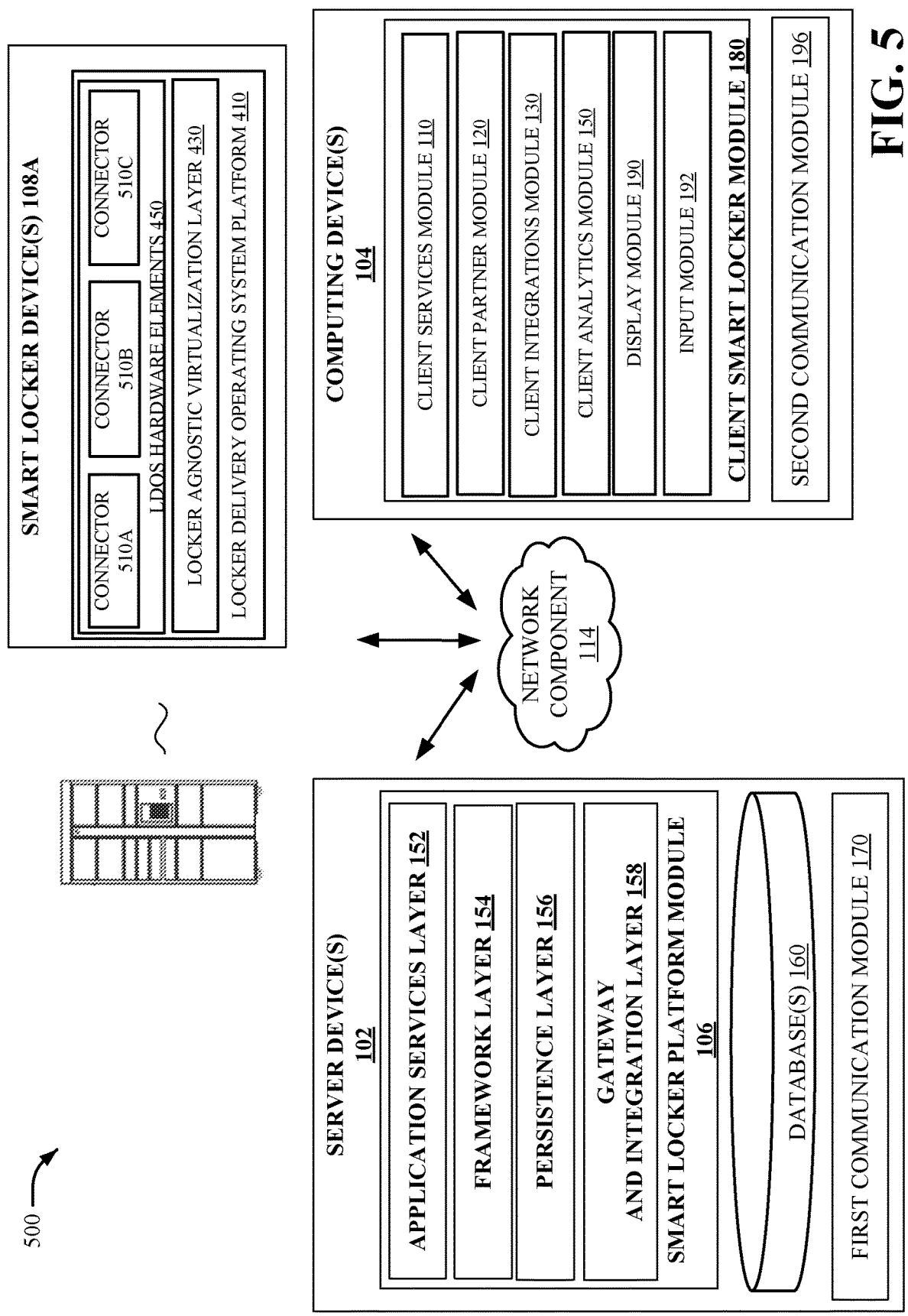
FIG. 5 illustrates an example, non-limiting environment 500 that includes server device(s) 102, computing device(s) 104, and locker delivery operating system platform 410 in accordance with one or more implementations.

Turning now to FIG. 5, illustrated is an example, non-limiting environment 500 that includes server device(s) 102, computing device(s) 104, and locker delivery operating system platform 410 in accordance with one or more implementations. Repetitive description of like elements employed in other embodiments described herein are omitted for sake of brevity. In an aspect, disclosed is smart locker device(s) 106A connected to LDOS platform 410 communicatively coupled to LDOS hardware elements 450 via locker agnostic virtualization layer 430. Furthermore, connector 510A, connector 510B, and connector 510C can represent various different connector architectures (e.g., RS-232, RS-485, Ethernet, etc.).

In non-limiting implementation 500, also disclosed are server device(s) 102 employing smart locker platform module 106, application services module 152, framework module 154, persistence module 156, and gateway and integration module 158. Furthermore, client device(s) 104 employs client smart locker module 180, client services module 110, client partner module 120, client integrations module 130, client analytics module 150, display module 190, and input module 192. In another aspect, network component 114 can generally represent any suitable type of communication network that facilitates a bi-directional link between various devices. In an aspect, network component 114 can include multiple interconnect communication networks that can comprise a plurality of interconnected elements, such as local area network (WLAN), a wireless access point connected to the internet, a wireless telecommunication network interconnected to the internet, an internet of things (IOT) network, and other such connections. In an implementation, network component 114 connects server device(s) 102 with client device(s) 104, and smart locker device(s) 108.

In an aspect, LDOS platform 410 can be employed to manage and communicate with one or more smart locker devices, where smart phones are configured to detect signal data corresponding to the smart locker device(s) 108. In an aspect, the signal data can represent a transmission signal (e.g., radio signal) from a Bluetooth Low Energy (BLE) technology integrated into smart locker devices. The BLE technology can be emitted by smart locker device(s) 108 and detected (e.g., using detection components) by client device(s) 104 (e.g., smart phone, etc.) based on execution of a micro-location technology such as GPS technology in connection with BLE. As such, detection can be based on a proximity of the smart phone within a range of the smart locker device(s) 108. As such, when a smart phone is detected within a threshold vicinity of the smart locker device(s) 108, then the smart phone, via an application, can detect the presence of the smart locker device(s). Furthermore, LDOS platform 410 can be employed to communicate with large volumes of a range of smart locker device(s) 108 to employ such detection mechanisms.

In another aspect, LDOS platform 410 can be employed to manage and communicate with several types of smart locker device(s) 108 implemented within user owned locations (e.g., garages, residential homes, stores, etc.). Furthermore, LDOS platform 410 can enable the deployment of operability and functionality among a discrete and unique smart locker device(s) 108 that vary in type and kind such that they are all operable within a single control platform. In an aspect, LDOS platform 410 can allows for the decentralization of storage warehouses and facilities by empowering every user device to allow its owner to use its space for storing packages. Furthermore, in an aspect, each owner can implement a smart locker device(s) 108 within the space to facilitate secure storage, delivery, and/or retrieval of items (e.g., packages, mail, articles, etc.) that can be configurable to communicate and function over a single LDOS platform 410. Accordingly, a homeowner can install a smart locker device(s) 108 (hardware and software) unit in its garage comprising several storage compartments thus allowing for a delivery company to drop off and/or pickup several packages at the garage location and allowing several consumers to drop off and/or pickup packages at the garage location. Furthermore, the homeowner can indicate a range of available timings for the smart mailbox's to be accessible and can indicate other preferences related to transactions (e.g., requirements on package sizes, requirements on delivery/pickup times, blackout dates, etc.). Furthermore, such owner user can employ LDOS platform 410 to enable operability of all such smart lockers. Also, LDOS platform 410 can allow courier devices, administrator devices, enterprise devices and other stakeholders to implement appropriate functionality to the smart locker(s) 108 as permitted as well (e.g., pickup, drop off, mapping of smart locker locations, payment models amongst a set of smart locker devices, hub and spoke model deployment, etc.).

In another aspect, LDOS platform 410 can communicatively couple to and control theme based functionality of a diverse array of smart locker device(s) 108 types. For instance, LDOS platform 410 can be communicatively coupled to a diverse set of smart locker device(s) types that can be integrated with a package analysis device that can read label data. For instance, the package analysis device can employ optical character recognition technology to extract information related to a package and compare such data including identification data (e.g., username, UUID information, etc.) to match the package data to respective metadata, such as theme information (e.g., birthday package, Christmas package, etc.).

In another instance, if the label data indicates that the item in the package is a gift, then music component can play music indicating the occasion for the gift (e.g., holiday, birthday, anniversary) and presentation component can display graphical images representing a gift-type of theme (e.g., a present with a bow presented at the user interface). In another aspect, music components (not illustrated) and presentation components (not illustrated) of the smart locker device(s) 108 can use preference data representing information such as a users' bookmark information, social media information (e.g., likes, groups, locations visited, etc.), cookie information, music library favorites, video library favorites, and other such information represented as data. In an instance, the music component and presentation component can determine music for playing and graphics for displaying based on a prediction of a users' preference based on historical preference data. Furthermore, LDOS platform 410 can employ theme based functionality across a host of diverse and discrete smart lockers based on theme based determinations.

In other implementations, LDOS platform 410 can be deployed to communicate with and control operability of a set of diverse smart locker related devices. For instance, LDOS platform 410 can be employed across a range of smart locker automated package reading and measuring devices. Furthermore, LDOS platform 410 can be deployed to integrate, communicate, and control operability of a set of digital smart lockers electrically coupled to vehicles for use in facilitating the transportation, receipt, and delivery of packages. In an aspect, such customized vehicles can be used to solve the last mile problem associated with transporting goods from a source location to a final destination such as delivering a package to a user. In an aspect, several stakeholders can utilize the vehicle electrically coupled to the smart locker device(s) 108 such as delivery organizations, consumers sending packages and/or consumers receiving packages.

In an instance, the vehicles can travel predetermined routes (e.g., implemented and/or determined via LDOS platform 410) or preferred routes or customized routes and consumers (e.g., user seeking to send or receive an item via vehicle storage lockers) can utilize an application executing on a user device to identify the location of a relevant smart locker vehicle. Furthermore, the user device can transmit data (e.g., location data, request data, unlock/lock data, authentication data, etc.) to the smart locker vehicle (e.g., via a network, server device(s), etc.) or a LDOS platform 410 accessible to the smart locker vehicle or a set of smart locker vehicles.

In another aspect, LDOS platform 410 can control, communicate with, integrate with, or operability enable functionality of a set of package analysis devices. In an aspect, a package analysis device can be a device that analyzes packages using various device components. For instance, a package analysis device can determine the dimensions of a package, such dimensions comprising a length, breadth (also referred to as width) and height. Furthermore, package analysis device can retrieve package label information in connection with a label recognition device (e.g., a server) that performs optical character recognition operations on one or more image (e.g., image data) of the package label. In another aspect, package analysis device in connection with mailroom application can automatically unlock a smart locker device(s) 108 compartment door based on a fit between the package dimensions (e.g., determined length, breadth, and height) and the containment size of the smart locker compartment. In yet another aspect, package analysis device in connection with a mailroom server device can determine an appropriate grid and coordinates within a grid corresponding to a package room to which the package can be stored based on the package dimensions and the space available at the respective grid coordinates. Furthermore, LDOS platform 410 can control and communicate with a variety of package analysis devices. Furthermore, LDOS platform 410 can acquire data and extract insights from a range of such devices. In another aspect, LDOS platform 410 can propagate changes to the operability of such package analysis devices based on the extracted insights and learnings from the set of discrete and/or integrated package analysis devices.

In yet another aspect, package analysis device can comprise a circuit board comprising one or more microprocessor(s), memories, input/output capabilities and other such features. In another aspect, package analysis device can comprise an industrial camera that facilitates execution of optical character recognition operations. For instance, the industrial camera can inspect and verify number, character (e.g., in varying fonts, sizes, styles, etc.), and language (types) present on a label of a package. Furthermore, the industrial camera element can be trained to allow for the characterization and classification of various data sets (e.g., determine shape, size, consistency of characters, numerals, letters, symbols, logos, images, etc.). In one or more non-limiting embodiments, a depth sensor or camera can be employed to measure a package height. For instance, the package can be located on a table or podium that is a set distance from package analysis device (or the camera on device). The depth camera can measure the difference in height between the package analysis device and top surface of a package resting on the podium and subtract such distance from the distance between the podium and device to arrive at the package depth.

In another non-limiting embodiment, package analysis device can comprise a power supply for the computer board or circuit board and/or a containment mechanism to integrate all of the components. In other embodiments, package analysis device can be communicatively coupled to a smart locker device(s) 108 and allow for the efficient determination of a package size (e.g., dimensions) and simultaneous opening of a locker compartment door of smart locker device based on the determined dimensions of the package. Furthermore, in an aspect, package analysis device can retrieve optical character recognition information from package label information, capture (e.g., with an industrial camera) one or more package image(s), and assign package identification information (e.g., UUID) to a package.

In yet another aspect, package analysis device can employ a computer board (e.g., UP Board), an autofocus camera (e.g., 13 megapixel or other such megapixel quantity camera for instance), and a depth camera (e.g., real sense depth camera). In an instance, the depth camera can measure a distance between an obstacle (e.g., a package top surface) and a module of package analysis device (e.g., module integrating all device elements). In one or more non-limiting embodiments, an ultrasonic sensor can be employed to capture the distance. In another aspect, package analysis device can comprise an autofocus camera to capture one or more image of a package label and/or a package top surface (e.g., to extract boundary information to ascertain length and breadth dimensions of the package).

In an aspect, package analysis device can generate significant efficiencies for mailroom package delivery operations. For instance, in the absence of a package analysis device, a mailroom administrator can take several dozens of minutes to determine a place to store a package within a mailroom and even so it may not be an optimal storage location. However, package analysis device allows for the mailroom administrator to take 15-25 seconds to secure a package by employing the automated mechanisms of dimension determination and grid location to store such package. In a non-limiting embodiment, a mailroom can be an enclosed room controlled by a smart lock. Furthermore, the grid can identify locations with the mailroom that indicate storage locations for packages in an organized manner within the enclosed room (e.g., on shelf's, floors, etc.). In another aspect, LDOS platform 410 can control the mailroom functions and package analysis device functions as well as integrate both mechanisms.

Figure 6:
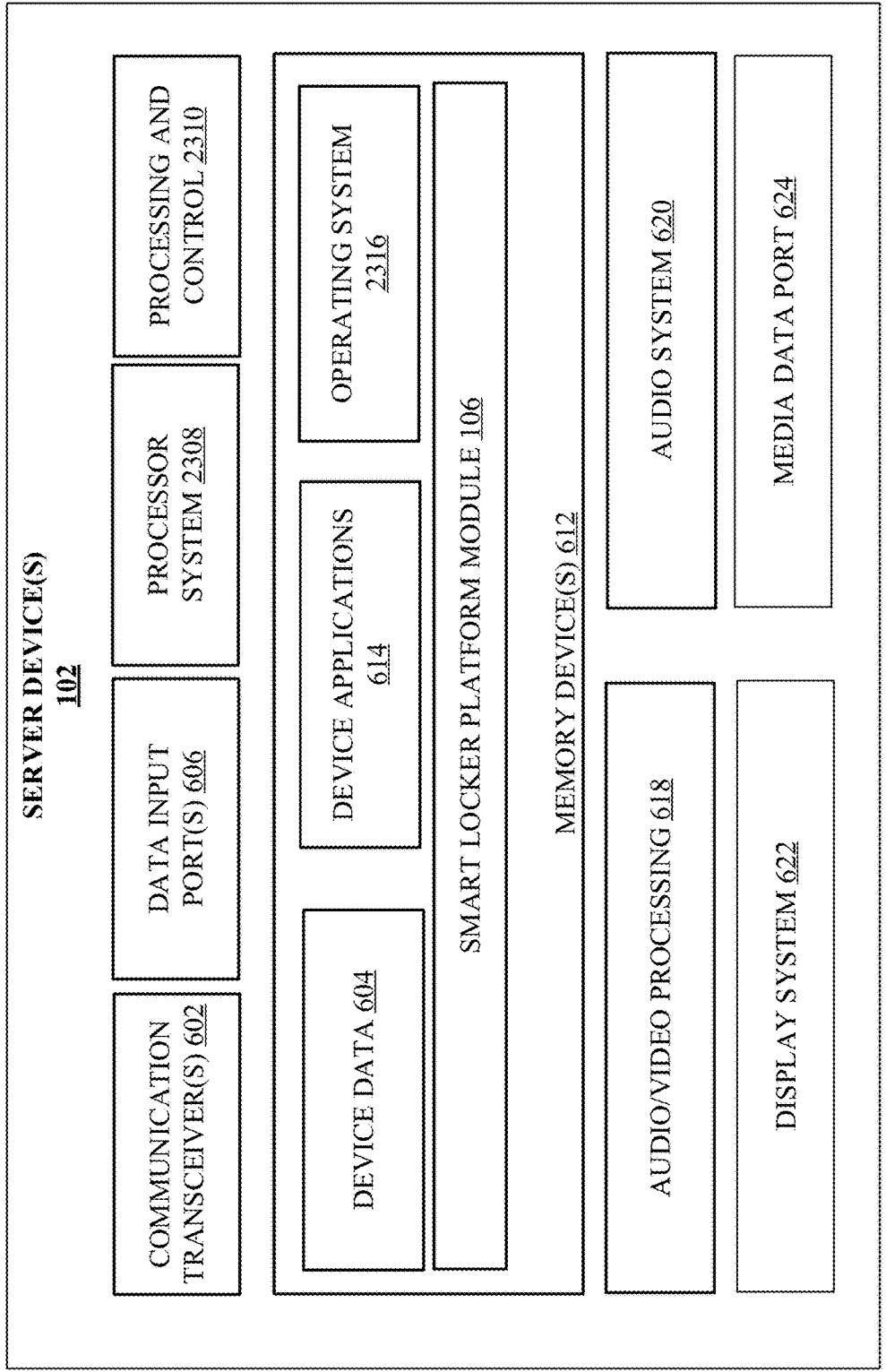
FIG. 6 illustrates an example client device in accordance with one or more implementations.

FIG. 6 illustrates an example client device in accordance with one or more implementations. Repetitive description of like elements employed in other embodiments described herein are omitted for sake of brevity.

In an aspect, various components of an example server device(s) 102 is illustrated in system component 600. In an aspect, server device(s) 102 can be used to implement various aspects of smart locker device operability as further described herein. In some implementations, server device(s) 102 and computing device(s) 104 have some similar components. Server device(s) 102 includes communication transceivers 602 that enable wired or wireless communication of device data 604, such as received data and transmitted data. In an aspect, communication transceiver 602 can include separate transmit antennas and receive antennas. Example communication transceivers include Wireless Personal Area Network (WPAN) radios compliant with various Institute of Electrical and Electronic Engineers (IEEE) 802.15 (Bluetooth™) standards, Wireless Local Area Network (WLAN) radios compliant with any of the various IEEE 802.11 (WiFi™) standards, Wireless Wide Area Network (WWAN) radios for cellular telephony (3GPP-compliant), wireless metropolitan area network radios compliant with various IEEE 802.16 (WiMAX™) standards, and wired Local Area Network (LAN) Ethernet transceivers.

Server device 102 may also include one or more data input ports 606 via which any type of data, media content, and inputs can be received, such as user-selectable inputs, messages, music, television content, recorded video content, and any other type of audio, video, or image data received from any content or data source. Data input ports 606 may include Universal Serial Bus (USB) ports, coaxial-cable ports, and other serial or parallel connectors (including internal connectors) for flash memory, Digital Versatile Discs (DVDs), Compact Disks (CDs), and the like. These data-input ports may be used to couple the electronic device to components, peripherals, or accessories such as keyboards, microphones, or cameras.

Server device(s) 102 of this example includes processor system 608 (e.g., any of application processors, microprocessors, digital-signal processors, controllers, and the like) or a processor and memory system (e.g., implemented in a system-on-chip), which processes computer-executable instructions to control operation of the device. A processing system may be implemented at least partially in hardware, which can include components of an integrated circuit or on-chip system, digital-signal processor, application-specific integrated circuit, field-programmable gate array, a complex programmable logic device, and other implementations in silicon and other hardware. Alternatively, or in addition, the electronic device can be implemented with any one or combination of software, hardware, firmware, or fixed-logic circuitry that is implemented in connection with processing and control circuits, which are generally identified as processing and control 610. Although not shown, server device(s) 102 can include a system bus, crossbar, interlink, or data-transfer system that couples the various components within the device. A system bus can include any one or combination of different bus structures, such as a memory bus or memory controller, data protocol/format converter, a peripheral bus, a universal serial bus, a processor bus, or local bus that utilizes any of a variety of bus architectures.

Server device(s) 102 also includes one or more memory devices 612 that enable data storage, examples of which include random access memory (RAM), non-volatile memory (e.g., read-only memory (ROM), flash memory, EPROM, EEPROM, etc.), and a disk storage device. Memory devices 612 are implemented at least in part as a physical device that stores information (e.g., digital or analog values) in storage media, which does not include propagating signals or waveforms. The storage media may be implemented as any suitable types of media such as electronic, magnetic, optic, mechanical, quantum, atomic, and so on. Memory devices 612 provide data storage mechanisms to store the device data 604, other types of information or data, and/or various device applications 614 (e.g., software applications). For example, operating system 616 can be maintained as software instructions within memory devices 612 and executed by processor system 608.

Server device 102 optionally includes audio and video processing system 618 and video processing system 618 that processes audio data and passes through the audio and video data to optional audio system 620. Audio system 620 and optional display system 622 may include any modules that process, display, or otherwise render audio, video, display, or image data. Display data and audio signals can be communicated to an audio component and to a display component via a radio-frequency link, S-video link, HDMI, composite-video link, component-video link, digital video interface, analog-audio connection, or other similar communication link, such as optional media data port 624. In some implementations, optional audio system 620 and optional display system 622 are external components to server device 102. Alternatively, or additionally, optional audio system 620 and optional display system 622 can be an integrated component of the example server device 102, such as part of an integrated speaker and/or an integrated display and touch interface.

In some aspects, memory devices 612 of server device 102 includes smart locker platform module 106 to provide smart locker operability to various computing devices. In one or more implementations, smart locker platform module 106 is implemented to provide cloud-based services to remote devices, such as computing device 104 of FIG. 7. Smart locker platform module 106 identifies smart locker device(s) 108 and can execute smart locker operations and data acquisition and curations tasks as further described herein.

Figure 7:
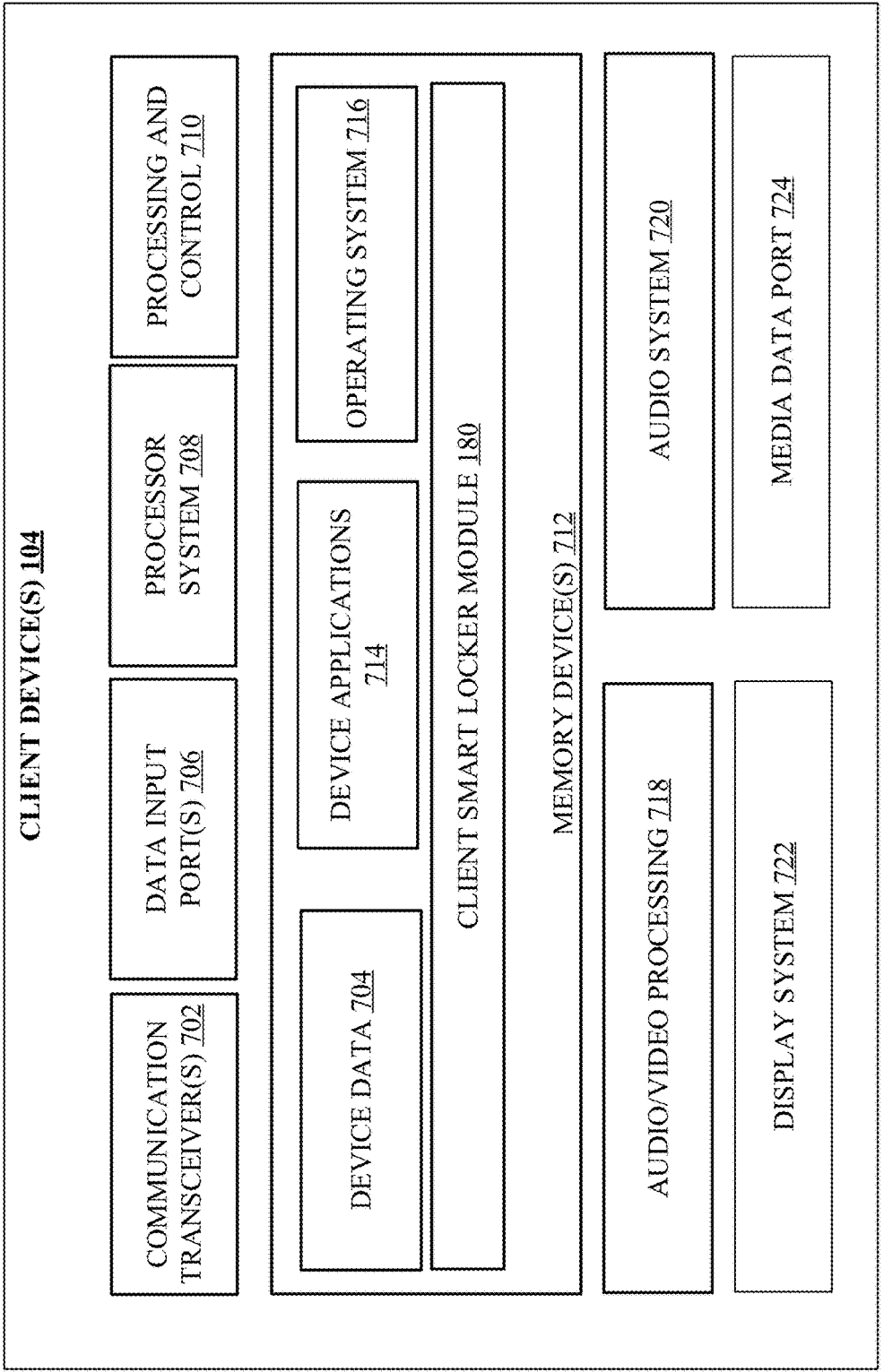
FIG. 7 illustrates an example server device in accordance with one or more implementations.

FIG. 7 illustrates an example server device in accordance with one or more implementations. Repetitive description of like elements employed in other embodiments described herein are omitted for sake of brevity.

In an aspect, various components of an example computing device(s) 104 is illustrated in system component 700. In an aspect, computing device(s) 104 can be used to implement various aspects of smart locker device operability as further described herein. computing device(s) 104 includes communication transceivers 702 that enable wired or wireless communication of device data 704, such as received data and transmitted data. In an aspect, communication transceiver 702 can include separate transmit antennas and receive antennas. Example communication transceivers include Wireless Personal Area Network (WPAN) radios compliant with various Institute of Electrical and Electronic Engineers (IEEE) 802.15 (Bluetooth™) standards, Wireless Local Area Network (WLAN) radios compliant with any of the various IEEE 802.11 (WiFi™) standards, Wireless Wide Area Network (WWAN) radios for cellular telephony (3GPP-compliant), wireless metropolitan area network radios compliant with various IEEE 802.16 (WiMAX™) standards, and wired Local Area Network (LAN) Ethernet transceivers.

Computing device(s) 104 may also include one or more data input ports 706 via which any type of data, media content, and inputs can be received, such as user-selectable inputs, messages, music, television content, recorded video content, and any other type of audio, video, or image data received from any content or data source. Data input ports 706 may include Universal Serial Bus (USB) ports, coaxial-cable ports, and other serial or parallel connectors (including internal connectors) for flash memory, Digital Versatile Discs (DVDs), Compact Disks (CDs), and the like. These data-input ports may be used to couple the electronic device to components, peripherals, or accessories such as keyboards, microphones, or cameras.

Computing device(s) 104 of this example includes processor system 708 (e.g., any of application processors, microprocessors, digital-signal processors, controllers, and the like) or a processor and memory system (e.g., implemented in a system-on-chip), which processes computer-executable instructions to control operation of the device. A processing system may be implemented at least partially in hardware, which can include components of an integrated circuit or on-chip system, digital-signal processor, application-specific integrated circuit, field-programmable gate array, a complex programmable logic device, and other implementations in silicon and other hardware. Alternatively, or in addition, the electronic device can be implemented with any one or combination of software, hardware, firmware, or fixed-logic circuitry that is implemented in connection with processing and control circuits, which are generally identified as processing and control 710. Although not shown, computing device(s) 104 can include a system bus, crossbar, interlink, or data-transfer system that couples the various components within the device. A system bus can include any one or combination of different bus structures, such as a memory bus or memory controller, data protocol/format converter, a peripheral bus, a universal serial bus, a processor bus, or local bus that utilizes any of a variety of bus architectures.

Computing device(s) 104 also includes one or more memory devices 712 that enable data storage, examples of which include random access memory (RAM), non-volatile memory (e.g., read-only memory (ROM), flash memory, EPROM, EEPROM, etc.), and a disk storage device. Memory devices 712 are implemented at least in part as a physical device that stores information (e.g., digital or analog values) in storage media, which does not include propagating signals or waveforms. The storage media may be implemented as any suitable types of media such as electronic, magnetic, optic, mechanical, quantum, atomic, and so on. Memory devices 712 provide data storage mechanisms to store the device data 704, other types of information or data, and/or various device applications 714 (e.g., software applications). For example, operating system 616 can be maintained as software instructions within memory devices 712 and executed by processor system 608.

Computing device(s) 104 optionally includes audio and video processing system 718 and video processing system 718 that processes audio data and passes through the audio and video data to optional audio system 720. Audio system 720 and optional display system 722 may include any modules that process, display, or otherwise render audio, video, display, or image data. Display data and audio signals can be communicated to an audio component and to a display component via a radio-frequency link, S-video link, HDMI, composite-video link, component-video link, digital video interface, analog-audio connection, or other similar communication link, such as optional media data port 724. In some implementations, optional audio system 720 and optional display system 722 are external components to computing device(s) 104. Alternatively, or additionally, optional audio system 720 and optional display system 722 can be an integrated component of the example computing device(s) 104, such as part of an integrated speaker and/or an integrated display and touch interface.

In some aspects, memory devices 712 of computing device(s) 104 includes client smart locker module 180 to provide smart locker device operability to various computing devices. In one or more implementations, client smart locker module 180 is implemented to provide cloud-based services to remote devices, such as smart locker platform module 106 of FIG. 6. Client smart locker module 180 identifies smart locker device(s) 108 and can execute smart locker operations and data acquisition and curations tasks as well as render aspects of smart locker platform module 106 on a client device 104 display as further described herein.

In view of the many possible aspects to which the principles of the present discussion may be applied, it should be recognized that the implementations described herein with respect to the drawing figures are meant to be illustrative only and should not be taken as limiting the scope of the claims. Therefore, the techniques as described herein contemplate all such implementations as may come within the scope of the following claims and equivalents thereof.

Figure 8:
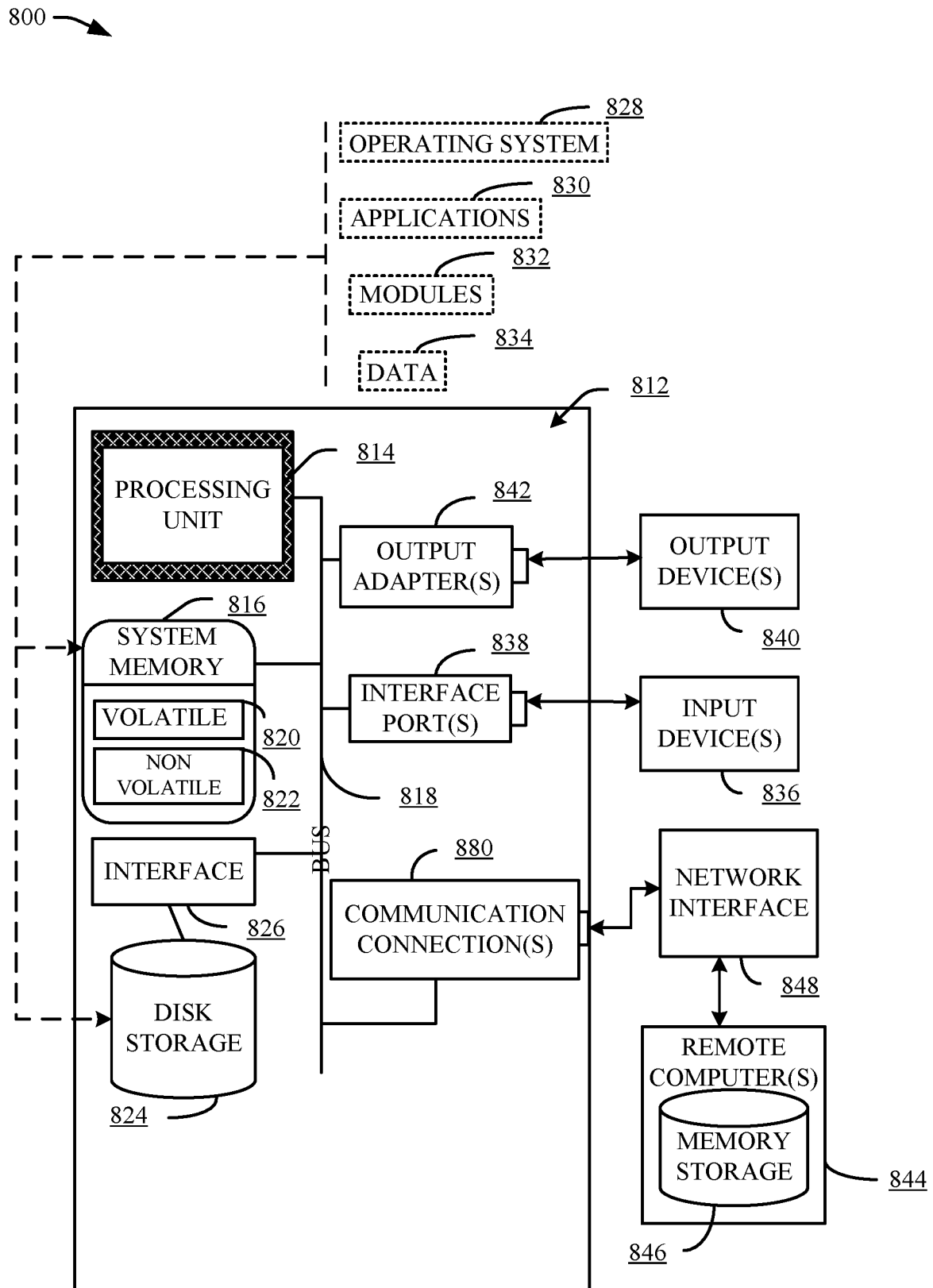
FIG. 8 illustrates a block diagram of an example, non-limiting operating environment in which one or more embodiments described herein can be facilitated.

FIG. 8 illustrates a block diagram of an example, non-limiting operating environment in which one or more embodiments described herein can be facilitated.

In order to provide a context for the various aspects of the disclosed subject matter, FIG. 8 as well as the following discussion is intended to provide a general description of a suitable environment in which the various aspects of the disclosed subject matter can be implemented. FIG. 8 illustrates a block diagram of an example, non-limiting operating environment in which one or more embodiments described herein can be facilitated. With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 820 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output device 840 like monitors, speakers, and printers, among other such output device 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
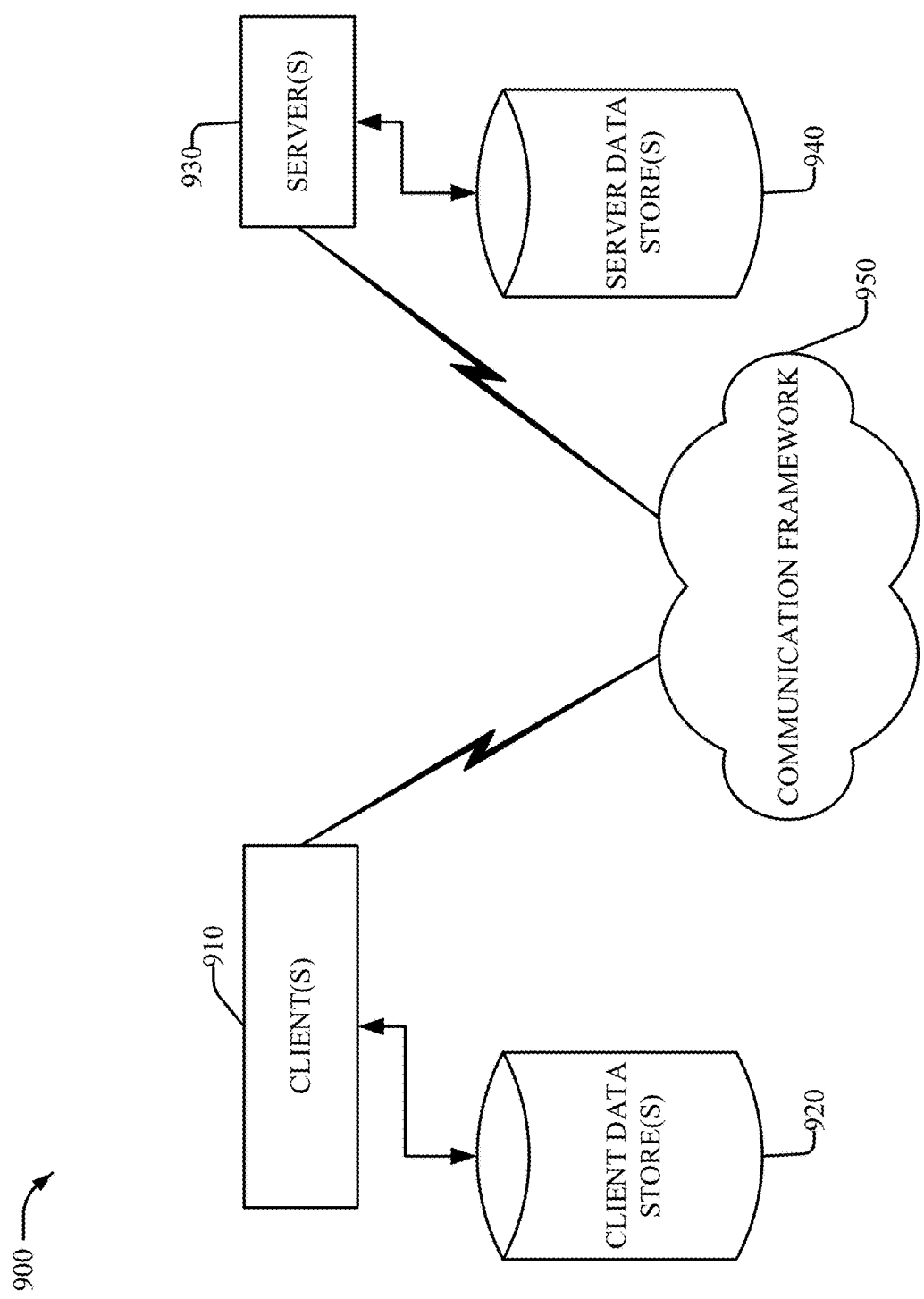
FIG. 9 illustrates a block diagram representing an exemplary non-limiting computing system or operating environment in which the various embodiments may be implemented.

FIG. 9 illustrates a block diagram representing an exemplary non-limiting computing system or operating environment in which the various embodiments may be implemented.

Referring now to FIG. 9, there is illustrated a schematic block diagram of a computing environment 900 in accordance with this disclosure. The system 900 includes one or more client(s) 902 (e.g., laptops, smart phones, PDAs, media players, computers, portable electronic devices, tablets, and the like). The client(s) 902 can be hardware and/or software (e.g., threads, processes, computing devices). The system 900 also includes one or more server(s) 904. The server(s) 904 can also be hardware or hardware in combination with software (e.g., threads, processes, computing devices). The servers 904 can house threads to perform transformations by employing aspects of this disclosure, for example. One possible communication between a client 902 and a server 904 can be in the form of a data packet transmitted between two or more computer processes wherein the data packet may include video data. The data packet can include a metadata, e.g., associated contextual information, for example. The system 900 includes a communication framework 906 (e.g., a global communication network such as the Internet, or mobile network(s)) that can be employed to facilitate communications between the client(s) 902 and the server(s) 904.

Communications can be facilitated via a wired (including optical fiber) and/or wireless technology. The client(s) 902 include or are operatively connected to one or more client data store(s) 908 that can be employed to store information local to the client(s) 902 (e.g., associated contextual information). Similarly, the server(s) 904 are operatively include or are operatively connected to one or more server data store(s) 910 that can be employed to store information local to the servers 904. In one embodiment, a client 902 can transfer an encoded file, in accordance with the disclosed subject matter, to server 904. Server 904 can store the file, decode the file, or transmit the file to another client 902. It is to be appreciated, that a client 902 can also transfer uncompressed file to a server 904 and server 904 can compress the file in accordance with the disclosed subject matter. Likewise, server 904 can encode video information and transmit the information via communication framework 906 to one or more clients 902.

The present disclosure may be a system, a method, an apparatus and/or a computer program product at any possible technical detail level of integration. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
one or more processors; and
one or more storage devices comprising processor executable instructions that, responsive to execution by the one or more processors, cause the system to perform operations comprising:
receiving, by a smart locker platform module, a request to execute at least one of a client services operation, a client partner operation, a client integrations operation, or a client analytics operation;
initiating, by the smart locker platform module, fulfilment of the request based on execution of at least one of an application services module, a framework module, or a persistence module;
receiving, by the application services module of the smart locker platform module, a query request;
accessing, by the framework module of the smart locker platform module, curated application event data from an application data store or application audit data from an application audit data store respectively based on a trigger event to perform a query analysis;
extracting, by an analytics module of the framework module, target event data or target audit data corresponding to the query analysis; and
provisioning, by the application services module, the target event data, target audit data or transformed target event data, or transformed target audit data to an interface display.

2. The system of claim 1, wherein the request is a package deposit request within a target smart locker compartment or a package retrieval request from the target smart locker compartment, wherein the operations further comprise:
receiving, by the application services module, a smart locker identifier and a package identifier;
sending, by a smart locker module employed by the application services module, an unlock request to a smart locker device comprising the target smart locker compartment;
receiving, by the smart locker module, a notification of an occurrence of an unlocking event of the target smart locker compartment, a door closing event of the target smart locker compartment, and a locking event of the target smart locker compartment; and
sending, by the smart locker module, an update to a partner application module of the occurrence of the unlocking event, the door closing event, and the locking event.

3. The system of claim 1, wherein the operations further comprise:
extracting, by the analytics module, information from the target event data or the target audit data based at least on key words of the query analysis; and
identifying, by the analytics module, insights corresponding to smart locker events, mailroom events, service level events, package-related events, package scheduling events, or administrative events.

4. The system of claim 1, wherein the request is a courier authentication request from a smart locker console, wherein the operations further comprise:
authenticating, by a role-based security module of the framework module, a courier identity based on the courier authentication request;
receiving, by the application services module of the smart locker platform module, updated smart locker events;

storing, by a database of the smart locker platform module, transactions corresponding to the updated smart locker events; and notifying, by the application services module of the smart locker platform module, the smart locker application of a client device, of a passcode to retrieve a package from a target smart locker compartment.

5. The system of claim 1, wherein the request is a consumer authentication request from a smart locker console, wherein the operations further comprise:

authenticating, by a role-based security module of the framework module, a consumer identity based on the consumer authentication request;

receiving, by the application services module of the smart locker platform module, updated smart locker events comprising at least one of a smart locker unlock operation, a smart locker door opening event, or a smart locker lock operation; and storing, by a database of the smart locker platform module, transactions corresponding to the updated smart locker events.

6. The system of claim 1, wherein the request is a smart locker unlock request from a smart locker application executing on a user device, wherein the operations further comprise:

notifying, by the application services module of the smart locker platform module, a target smart locker to unlock a target smart locker compartment.

7. A system comprising:

one or more processors; and one or more storage devices comprising processor executable instructions that, responsive to execution by the one or more processors, cause the system to perform operations comprising:

a smart locker delivery operating system configured to communicatively couple with a first smart locker device and a second smart locker device, wherein the first smart locker device, and the second smart locker device are different types of smart locker devices; and a first set of diverse connector ports coupled to a first motherboard of the first smart locker device and a second set of diverse connector ports coupled to a second motherboard of the second smart locker device, wherein the smart locker delivery operating system is communicatively coupled to the first smart locker device and the second smart locker device via the first set of diverse connector ports and the second set of diverse connector ports respectively.

8. The system of claim 7, wherein the smart locker delivery operating system further comprises:

an application service layer configured to control access to the first smart locker device and the second smart locker device, by one or more client device.

9. The system of claim 7, wherein the smart locker delivery operating system further comprises a locker agnostic virtualization layer configured to:

share learned information between the first smart locker device and the second smart locker device;

extract insights from the learned information; and modify executional operations of the first smart locker device or the second smart locker device based on the insights.

10. The system of claim 7, wherein the smart locker delivery operating system is further configured to:

integrate with a set of package analysis devices; and retrieve, from the package analysis devices, label information from execution of optical character recognition operations.

11. The system of claim 7, wherein the smart locker delivery operating system further comprises:

a framework layer that configures hardware or software components of the first smart locker device or the second smart locker device.

12. The system of claim 11, where the framework layer comprises a role-based security module configured to assign roles to user devices.

13. A computer-implemented method comprising:

receiving, by at least one processor executing a smart locker platform module, a request to execute at least one of a client services operation, a client partner operation, a client integrations operation, or a client analytics operation;

initiating, by the at least one processor executing the smart locker platform module, fulfilment of the request based on execution of at least one of an application services module, a framework module, or a persistence module;

receiving, by the application services module of the smart locker platform module, a query request;

accessing, by the framework module of the smart locker platform module, curated application event data from an application data store or application audit data from an application audit data store respectively based on a trigger event to perform a query analysis;

extracting, by an analytics module of the framework module, target event data or target audit data corresponding to the query analysis; and provisioning, by the application services module, the target event data, target audit data or transformed target event data, or transformed target audit data to an interface display.

14. The method of claim 13, further comprising:

receiving, by the application services module, a smart locker identifier and a package identifier;

sending, by a smart locker module employed by the application services module, an unlock request to a smart locker device comprising the target smart locker compartment;

receiving, by the smart locker module, a notification of an occurrence of an unlocking event of the target smart locker compartment, a door closing event of the target smart locker compartment, and a locking event of the target smart locker compartment; and sending, by the smart locker module, an update to a partner application module of the occurrence of the unlocking event, the door closing event, and the locking event.

15. The method of claim 13, further comprising:

extracting, by the analytics module, information from the target event data or the target audit data based at least on key words of the query analysis; and identifying, by the analytics module, insights corresponding to smart locker events, mailroom events, service level events, package-related events, package scheduling events, or administrative events.

16. The method of claim 13, wherein the request is a consumer authentication request from a smart locker console, wherein the method further comprises:

authenticating, by a role-based security module of the framework module, a consumer identity based on the consumer authentication request;

receiving, by the application services module of the smart locker platform module, updated smart locker events comprising at least one of a smart locker unlock operation, a smart locker door opening event, or a smart locker lock operation; and storing, by a database of the smart locker platform module, transactions corresponding to the updated smart locker events.

17. The method of claim 13, wherein the request is a courier authentication request from a smart locker console, wherein the method further comprises:

authenticating, by a role-based security module of the framework module, a courier identity based on the courier authentication request;

receiving, by the application services module of the smart locker platform module, updated smart locker events;

storing, by a database of the smart locker platform module, transactions corresponding to the updated smart locker events; and notifying, by the application services module of the smart locker platform module, the smart locker application of a client device, of a passcode to retrieve a package from a target smart locker compartment.

18. The method of claim 13, wherein the request is a consumer authentication request from a smart locker console, wherein the method further comprises:

authenticating, by a role-based security module of the framework module, a consumer identity based on the consumer authentication request;

receiving, by the application services module of the smart locker platform module, updated smart locker events comprising at least one of a smart locker unlock operation, a smart locker door opening event, or a smart locker lock operation; and storing, by a database of the smart locker platform module, transactions corresponding to the updated smart locker events.

19. The method of claim 13, wherein the request is a smart locker unlock request from a smart locker application executing on a user device, wherein the method further comprises:

notifying, by the application services module of the smart locker platform module, a target smart locker to unlock a target smart locker compartment.

* * * * *